United States Patent
Fernández Lozano et al.

(10) Patent No.: US 10,899,960 B2
(45) Date of Patent: Jan. 26, 2021

(54) NANOSTRUCTURED PHOSPHORESCENT PIGMENT AND USES THEREOF

(71) Applicants: Fábrica Nacional De Moneda Y Timbre—Real Casa De La Moneda, Madrid (ES); Consejo Superior De Investigaciones Científicas, Madrid (ES)

(72) Inventors: José Francisco Fernández Lozano, Madrid (ES); Rocío Estefanía Rojas Hernández, Madrid (ES); Esther Enríquez Pérez, Madrid (ES); Fernando Rubio Marcos, Madrid (ES); Vicente García Juez, Madrid (ES); Lara Antón Ibáñez, Madrid (ES)

(73) Assignees: CONSEJO SUPERIOR DE INVESTIGACIONES CIENTÍFICAS, Madrid (ES); FÁBRICA NACIONAL DE MONEDA Y TIMBRE—REAL CASA DE LA MONEDA, Madrid (ES)

( * ) Notice: Subject to any disclaimer, the term of this patent is extended or adjusted under 35 U.S.C. 154(b) by 387 days.

(21) Appl. No.: 15/738,024

(22) PCT Filed: Jun. 17, 2016

(86) PCT No.: PCT/EP2016/064004
§ 371 (c)(1),
(2) Date: Dec. 19, 2017

(87) PCT Pub. No.: WO2016/202979
PCT Pub. Date: Dec. 22, 2016

(65) Prior Publication Data
US 2018/0282618 A1 Oct. 4, 2018

(30) Foreign Application Priority Data
Jun. 19, 2015 (EP) .................................... 15382329

(51) Int. Cl.
*C09K 11/02* (2006.01)
*C09K 11/77* (2006.01)
(Continued)

(52) U.S. Cl.
CPC ............ *C09K 11/025* (2013.01); *B42D 25/29* (2014.10); *B42D 25/378* (2014.10); *C09D 5/22* (2013.01);
(Continued)

(58) Field of Classification Search
CPC .. C09K 11/025; C09K 11/7734; B42D 25/29; B42D 25/36; B42D 25/23; B42D 25/24; B42D 25/20
See application file for complete search history.

(56) References Cited

U.S. PATENT DOCUMENTS

| | | |
|---|---|---|
| 5,424,006 A | 6/1995 | Murayama et al. |
| 6,284,156 B1 | 9/2001 | Uehara et al. |

(Continued)

FOREIGN PATENT DOCUMENTS

| | | |
|---|---|---|
| EP | 0622440 | 11/1994 |
| EP | 1368799 | 12/2003 |

(Continued)

OTHER PUBLICATIONS

Rojas-Hernandezet al, "Original Synthetic Route to Obtaina SrAl2O4 Phosphor by the Molten Salt Method: In Sights into the Reaction Mechanism and Enhancement of the Persistent Luminescence", Inorganic Chemistry, 54, 0/8/15, pp. 9896-9907.*

(Continued)

*Primary Examiner* — C Melissa Koslow
(74) *Attorney, Agent, or Firm* — Tristan A. Fuierer; Olive Law Group, PLLC

(57) ABSTRACT

The present invention relates to a nanostructured phosphorescent pigment comprising an $Al_2O_3$ substrate; $MAl_2O_4$:X (Continued)

nanocrystals, where M is a cation selected from $Ca^{2+}$, $Sr^{2+}$, $Ba^{2+}$, $Mg^{2+}$, $Zn^{3+}$ and combinations thereof and where X is a cation selected from $Eu^{3+}$, $Dy^{3+}$, $Nd^{3+}$, $Er^{3+}$, $La^{3+}$, $Lu^{3+}$, $Ce^{3+}$, $Y^{3+}$, $Gd^{3+}$, $Tb^{3+}$, $Tm^{3+}$, $Yb^{3+}$ and combinations thereof, disposed on the $Al_2O_3$ substrate; and nanocrystals of molten salt disposed on the $MAl_2O_4$:X nanocrystals. Additionally, the invention relates to a method for preparing the nanostructured phosphorescent pigment of the invention comprising the steps of i) mixing starting materials comprising a cation M precursor, a cation X precursor, $Al_2O_3$ and a molten salt; ii) heating the mixture resulting from step (i) in reducing atmosphere. The invention also relates to the use of the nanostructured phosphorescent pigment of the invention for signaling, illumination, decoration or authentication and to a security article comprising the nanostructured phosphorescent pigment of the invention.

16 Claims, 16 Drawing Sheets

(51) Int. Cl.
| | | |
|---|---|---|
| B42D 25/29 | (2014.01) | |
| B42D 25/378 | (2014.01) | |
| C09D 5/22 | (2006.01) | |
| G09F 3/02 | (2006.01) | |
| B42D 25/23 | (2014.01) | |
| B42D 25/24 | (2014.01) | |

(52) U.S. Cl.
CPC .......... *C09K 11/02* (2013.01); *C09K 11/7792* (2013.01); *G09F 3/02* (2013.01); *B42D 25/23* (2014.10); *B42D 25/24* (2014.10)

(56) References Cited

U.S. PATENT DOCUMENTS

| 8,030,624 B2 | 10/2011 | Kalish et al. |
|---|---|---|
| 8,470,200 B2 | 6/2013 | Kimura et al. |
| 2005/0068395 A1 | 3/2005 | Haubold et al. |
| 2005/0102733 A1 | 5/2005 | Holmberg et al. |
| 2006/0227532 A1 | 10/2006 | Ko et al. |

FOREIGN PATENT DOCUMENTS

| JP | 2000297279 A | 10/2000 |
|---|---|---|
| JP | 2002352213 A | 12/2002 |
| JP | 2005513198 A | 5/2005 |
| WO | WO-1997024699 | 7/1997 |
| WO | WO-2006054202 | 5/2006 |
| WO | WO-2009053391 | 4/2009 |
| WO | 2010053197 A1 | 5/2010 |
| WO | WO-2010134805 | 11/2010 |
| WO | WO-2012139594 | 10/2012 |
| WO | WO-2016202979 | 12/2016 |

OTHER PUBLICATIONS

Haiyan, Du, et al., "Preparation of Non-Grinding Long Afterglow SrAl2O4: Eu2+, Dy3+ Material by Microwave Combustion Method", Journal of Rare Earths, vol. 25, Issue 1, Feb. 2007, pp. 19-22, (Feb. 2007), 19-22.

Li, Zushu, et al., "Molten salt synthesis of zinc aluminate powder", Journal of the European Ceramic Society, vol. 27, Issue 12, 2007, pp. 3407-3412, (Mar. 28, 2007), 3407-3412.

Liu, Liangliang, et al., "Microstructure and electrical properties of potassium strontium niobate (KSr2Nb5O15) ceramics", Journal of Alloys and Compounds, vol. 580, Dec. 15, 2013, pp. 93-100, (Dec. 15, 2013), 93-100.

Peng, Tianyou, et al., "Combustion synthesis and photoluminescence of SrAl2O4:Eu,Dy phosphor nanoparticles", Materials Letters, vol. 58, Issues 3-4, Jan. 2004, pp. 352-356, (Jan. 2004), 352-356.

Rojas-Hernandez, R. E., et al., "A low-energy milling approach to reduce particle size maintains the luminescence of strontium aluminates", RSC Adv., 2015,5, 42559-42567, (May 6, 2015), 42559-42567.

Safaei-Naeini, Y., et al., "The effects of temperature and different precursors in the synthesis of nano spinel in KCl molten salt", Ceramics International,vol. 38, Issue 1, Jan. 2012, pp. 841-845, (Aug. 11, 2011), 841-845.

Zhang, Shaowei, et al., "Molten Salt Synthesis of Magnesium Aluminate (MgAl2O4) Spinel Powder", Journal of the American Ceramic Society, 89: 1724-1726, (Mar. 14, 2006), 1724-1726.

Zhou, Hongjun, et al., "Probing Structure-Parameter Correlations in the Molten Salt Synthesis of BaZrO3 Perovskite Submicrometer-Sized Particles", Chem. Mater., 2007, 19 (22), pp. 5238-5249, (Oct. 5, 2007), 5238-5249.

"International Application No. PCT/EP2016/064004, International Search Report and Written Opinion dated Sep. 8, 2016", (Sep. 8, 2016), 9 pgs.

Rojas-Hernandez, R. E., et al., "Role of the oxidizing agent to complete the synthesis of strontium aluminate based phosphors by the combustion method", RSC Adv., 2015, 5, 3104-3112, (Dec. 2, 2014), 21 pgs.

Rojas-Hernandez, Rocío Estefanía, et al.; "Original Synthetic Route to Obtain a SrAl2O4 Phosphor by the Molten Salt Method: Insights into the Reaction mechanism and Enhancement of the Persistent Luminescence," Inorg. Chem, 2015, vol. 54, pp. 9896-9907; DOI: 10.1021/acs.inorgchem.5b01656.

Xu, Gangxian, Rare Earths, vol. 2, Version II, Metallurgical Industry Press, Chinese and English Summary, 1995.

* cited by examiner

NANOSTRUCTURED PHOSPHORESCENT PIGMENT AND USES THEREOF

PRIORITY CLAIM TO RELATED APPLICATIONS

This application is a U.S. national stage application filed under 35 U.S.C. § 371 from International Application Serial No. PCT/EP2016/064004, which was filed 17 Jun. 2016, and published as WO2016/202979 on 22 Dec. 2016, and which claims priority to European Patent Application No. 15382329.9, filed 19 Jun. 2015, which applications and publication are incorporated by reference as if reproduced herein and made a part hereof in their entirety, and the benefit of priority of each of which is claimed herein.

FIELD OF THE INVENTION

The present invention relates to the field of phosphorescent pigments and to the applications thereof.

BACKGROUND

Use of luminescent pigments for detecting the validity of security articles is widely known [WO 97/24699 A1]. They are also known to be used in construction forming part of cements [WO 2010/134805 A1], in emergency or safety signs [EP 1368799 B1] or in road signs [WO 2012/139594 A1], in electronic devices [US 2006/0227532 A1], in automobiles [U.S. Pat. No. 8,030,624 B2] or in fabrics [US 2005/0102733 A1]. They are also commonly used in cosmetic compositions [WO 2006/054202 A1] for providing a skin brightening or whitening effect.

The main type of luminescence used in all these applications is photoluminescence consisting of light emission by a luminescent pigment when the latter is exposed to a light source. Photoluminescence can usually be classified into fluorescence and phosphorescence, depending on the lifetime of the radiation emitted after the excitation with light. A pigment is said to be "fluorescent" when light emission is extinguished after a very short time, in the order of nanoseconds, after pigment excitation has been stopped. However, a pigment is referred to as "phosphorescent" if light emission continues for a longer period of time, of the order of milliseconds or more.

Among phosphorescent pigments, those based on inorganic matrices in which rare earths are usually incorporated as dopants to attain an optically active material stand out. U.S. Pat. No. 5,424,006 A (1995) describes for the first time phosphorescent pigments based on strontium aluminates doped with europium ($SrAl_2O_4$:Eu) and their derivatives, such as for example, $SrAl_2O_4$:Eu,Dy. Since then, the state of the art has focused on phosphorescent pigments based on aluminate matrices because these materials have a good efficiency in the persistence of luminescence, in addition to a high stability compared to silicates, aluminosilicates, oxides and sulfurs.

Conventional methods for preparing these aluminates involve lengthy thermal treatments that require high temperatures (1300-1500° C.) and reducing atmospheres ($N_2$—$H_2$) greatly increasing end product costs. Additionally, laborious and lengthy subsequent milling processes are required for obtaining pigment particles having a suitable dimension and uniformity. For this reason, methods for improving the uniformity of the mixture of precursor materials have been developed for the purpose of reducing the temperatures and times of subsequent thermal treatments [U.S. Pat. No. 6,284,156 B1].

Other developments have focused on minimizing the price of the materials. Shin-Etsu Chemical Co. describes in its U.S. Pat. No. 8,470,200 B2 the use of a recycled material which originates from phosphors used in fluorescent lamps or in plasma television displays, and is mixed with new aluminates doped with rare earths and subjected to calcination, thereby lowering the production costs.

However, particles having size between 10 µm and 1000 µm are obtained in the preceding methods, so the demand for a phosphorescent pigment compatible with applications requiring pigment particle sizes of less than 10 µm, such as for example, printing, is not met. This demand is usually met by starting out with a massive aluminate material and subjecting same to milling processes in order to reduce the final particle size [Haiyan, F.-H. et al. *Journal of Rare Earths. Chem. Phys.* 2007, 25(1):19-21]. However, the luminescent properties thereof are affected by the defects created during milling.

In addition, the methods described in the state of the art which synthesize aluminates with a crystal size <40 nm give rise to materials with high agglomeration and very low phosphorescence values [Tianyou, P. et al. *Mater. Lett.* 2004, 58(3-4):352-356].

Additionally, the use of phosphorescent pigments in some applications such as in security articles requires the material to be used in a low enough proportion without a skilled person being able to deduce the presence of these materials. The phosphorescent pigments must therefore have a high efficiency in the signal. The pigments must therefore have a unique characteristic that can be detected outside the known lengths which allow identifying the presence thereof unambiguously.

There is therefore a need in the state of the art of nanostructured phosphorescent pigments having a high luminescent efficiency and with unique properties that are quantifiable for their identification. Likewise, there is a need of a method for obtaining same.

BRIEF DESCRIPTION OF THE INVENTION

The authors of the present invention have prepared nanostructured aluminates by means of synthesis with molten salts having greater luminescence with respect to that described in the state of the art for the same range of pigment and aluminate nanocrystal particle size. Therefore, the phosphorescent pigments of the present invention have a particle size which is smaller than normal phosphorescent pigments and aluminate nanocrystals having optimal phosphorescent properties.

Since the phosphorescent pigments are doped with rare earths, they usually have a characteristic color, i.e., blue, yellow, green, brown or pinkish, because the cations causing electron transitions which give rise to phosphorescence are likewise cations having color effect due to the effect of the crystalline field. The pigments of the present invention are yellow-green colored but look whiter (color of the material without emitting light by phosphorescence) with respect to the phosphorescent materials of the state of the art. This property provides them with versatility in the application thereof as base pigments in different articles or compositions.

Another advantage of the pigments of the present invention is that they furthermore have unique Raman signals providing same with added complexity as a marker against the forgery of security articles since the pigments of the invention can be identified by combination of Raman spectroscopy and fluorometry.

The nanostructured phosphorescent pigments of the invention are prepared by means of a synthesis method with molten salts [Zhoug, H. et al. *Chem. Mater.* 2007, 19(22): 5238-5249; Li, Z. et al. *J. Eur. Ceram. Soc.* 2007, 27(12): 3407-3412; Liu, L. et al. *J. Alloys Comp.* 2013, 580:93-100]. This method allows obtaining the pigment directly with the desired particle size and morphology without the need of subsequent milling or calcinations which change the final phosphorescent properties of the pigment.

Therefore, in a first aspect the invention relates to a nanostructured phosphorescent pigment comprising an $Al_2O_3$ substrate; $MAl_2O_4$:X nanocrystals, where M is a cation selected from $Ca^{2+}$, $Sr^{2+}$, $Ba^{2+}$, $Mg^{2+}$, $Zn^{2+}$ and combinations thereof, and where X is a cation selected from $Eu^{2+}$, $Dy^{3+}$, $Nd^{3+}$, $Er^{3+}$, $La^{3+}$, $Lu^{3+}$, $Ce^{3+}$, $Y^{3+}$, $Sm^{3+}$, $Gd^{3+}$, $Tb^{3+}$, $Tm^{3+}$, $Yb^{3+}$ and combinations thereof, disposed on the $Al_2O_3$ substrate; and nanocrystals of salt used in a molten salt process disposed on the $MAl_2O_4$:X nanocrystals.

In a second aspect, the invention relates to a method for preparing the nanostructured phosphorescent pigment as defined above comprising the steps of i) mixing starting materials comprising a cation M precursor, a cation X precursor, $Al_2O_3$ and a salt used in a molten salt process; and ii) heating the mixture resulting from step (i) in reducing atmosphere.

Another aspect of the present invention relates to a nanostructured phosphorescent pigment obtainable by the method as defined above.

The invention also relates to the use of the nanostructured phosphorescent pigment as defined above for signaling, illumination, decoration or authentication.

Finally, the invention also relates to a security article comprising the nanostructured phosphorescent pigment as defined above.

DRAWINGS

Figure 12:
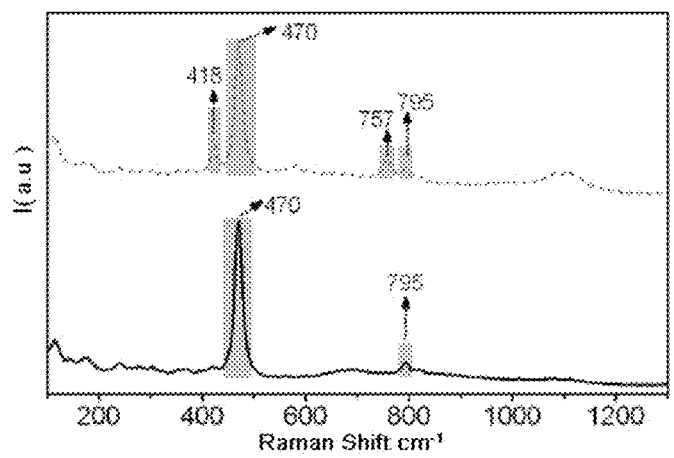
FIG. 12 shows the Raman spectrum of the material $SrAl_2O_4$:Eu,Dy corresponding to regions (11) in solid line and (12) in dotted line which are demarcated in the Raman surface image, XY, and Raman depth-scan image, XZ, of FIG. 13.

FIG. 13(a) shows the Raman image on surface XY of the material $SrAl_2O_4$:Eu,Dy. Two regions (11) and (12) which are coded by means of two different gray sections and correspond to the Raman spectra of FIG. 12, are demarcated in the image. FIG. 13(b) shows the Raman depth-scan image, XZ, of the dispersed tablet.

Figure 14:
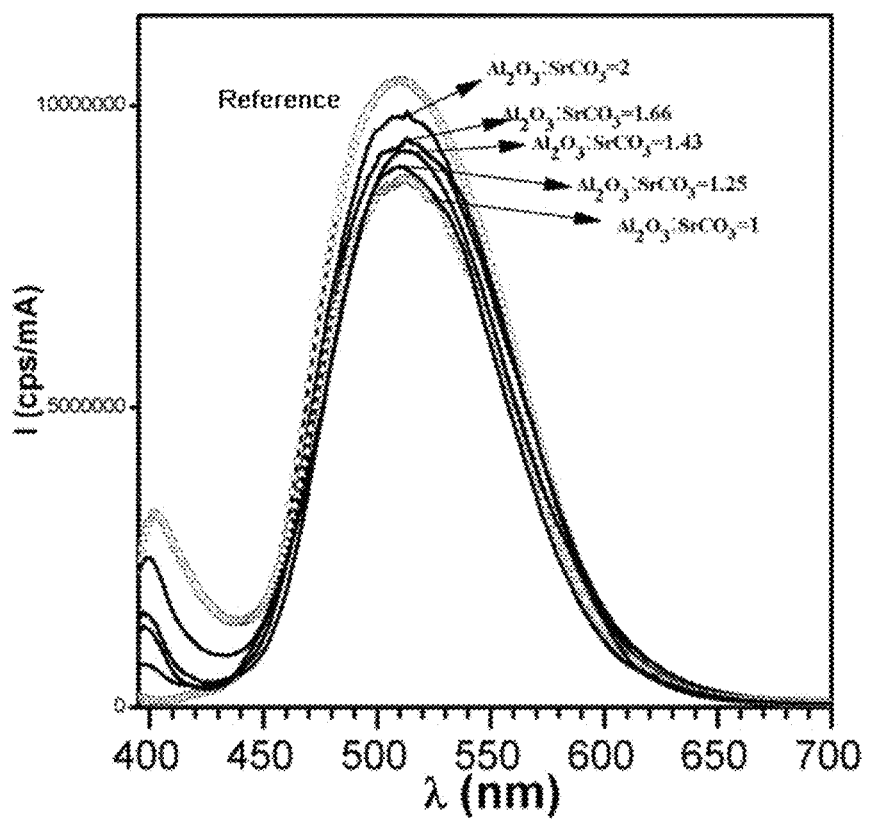

FIG. 14 shows the emission spectrum ($\lambda_{EXC}$=380 nm) of the reference material and the material $SrAl_2O_4$:Eu,Dy synthesized by means of a molten salt process with a salt: ($SrAl_2O_4$:Eu,Dy) ratio of 3:1 synthesized from alumina of 6 μm for 2 hours in a $N_2$—$H_2$ atmosphere using a temperature of 1000° C. and using different $Al_2O_3$/$SrCO_3$ ratios of 1.25, 1.43, 1.66 and 2.

Figure 15:
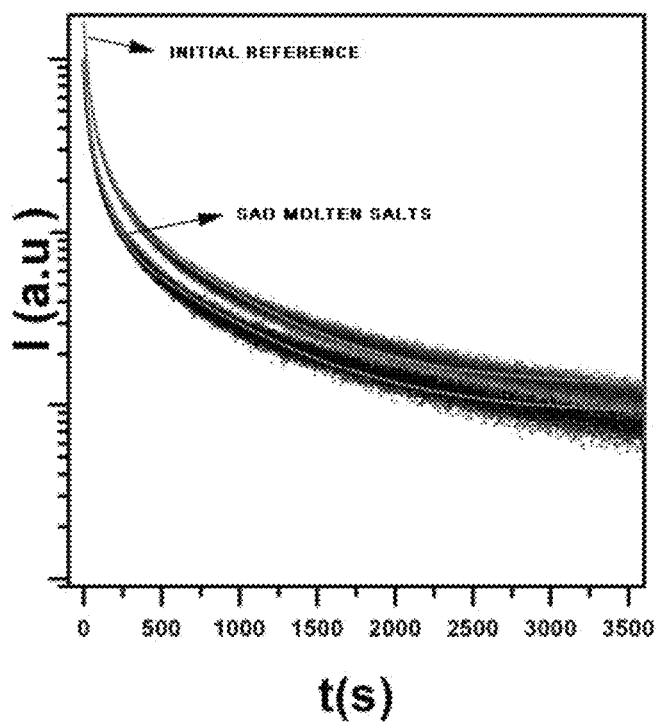

FIG. 15 shows the luminescence decay curve of the reference material (line with circles) and the material $SrAl_2O_4$:Eu,Dy synthesized by means of a molten salt process with a salt:($SrAl_2O_4$:Eu,Dy) ratio of 3:1 synthesized from alumina of 6 μm for 2 hours in a $N_2$—$H_2$ atmosphere using a temperature of 1000° C., setting the emission at 510 nm using an $Al_2O_3$/$SrCO_3$ ratio of 2 (line with triangles).

Figure 16:
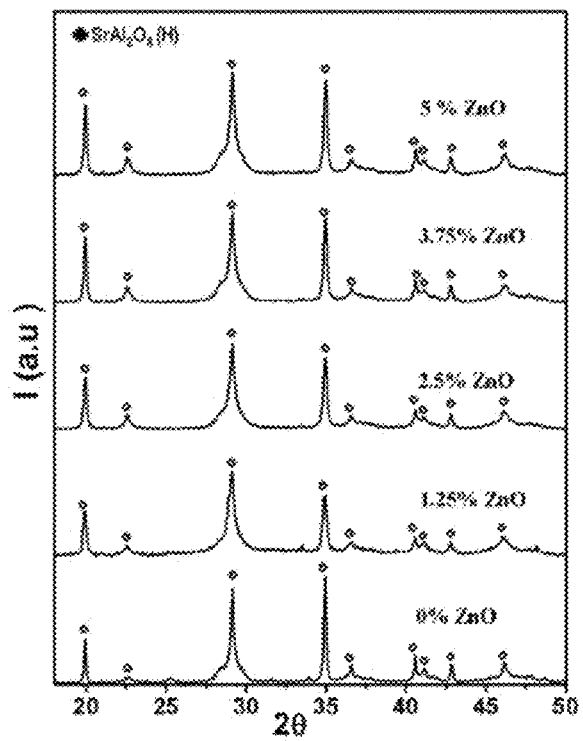

FIG. 16 shows the X-ray diffraction of the material $SrAl_2O_4$:Eu,Dy treated at 1000° C. for 2 hours in $N_2$—$H_2$ by means of a molten salt process for a salt:($SrAl_2O_4$:Eu,Dy) ratio of 3:1 from γ-$Al_2O_3$ incorporating excess $Al_2O_3$ ($Al_2O_3$/$SrCO_3$ of 2) and incorporating 1.25, 2.5, 3.75 and 5% by weight of ZnO.

Figure 17:
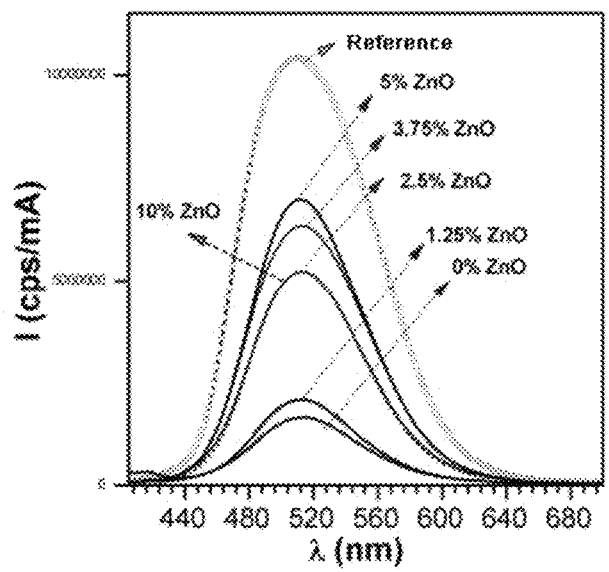

FIG. 17 shows the emission spectrum ($\lambda_{EXC}$=380 nm) of the reference material and the material $SrAl_2O_4$:Eu,Dy treated at 1000° C. for 2 hours in $N_2$—$H_2$ by means of a molten salt process for a salt:($SrAl_2O_4$:Eu,Dy) ratio of 3:1 from γ-$Al_2O_3$ incorporating excess $Al_2O_3$ ($Al_2O_3$/$SrCO_3$ ratio of 2) and incorporating 1.25, 2.5, 3.75 and 5% by weight of ZnO.

Figure 18:
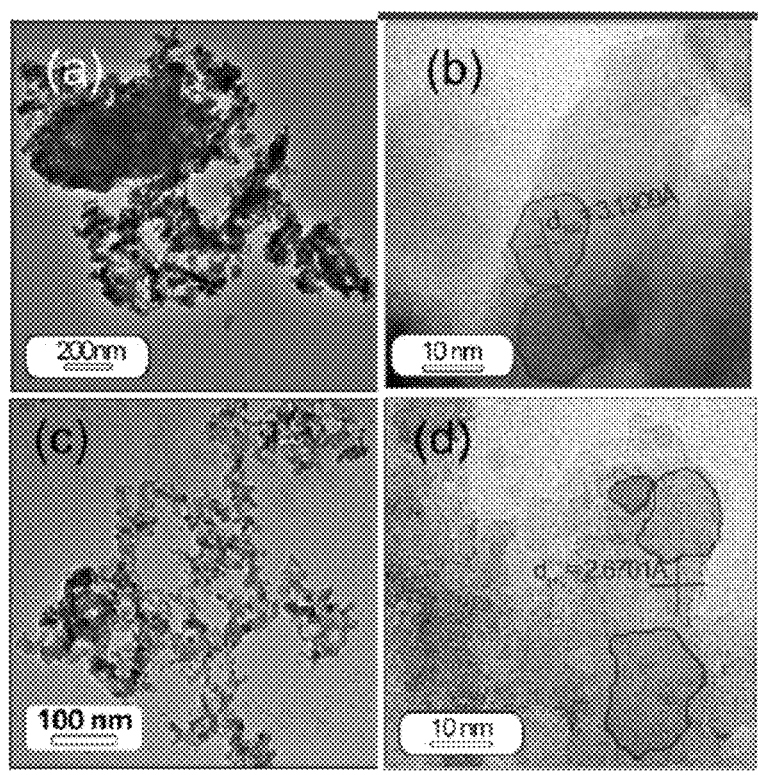

FIGS. 18(a-b) show the TEM micrographs of the material $SrAl_2O_4$:Eu,Dy synthesized from γ-$Al_2O_3$ incorporating excess $Al_2O_3$ ($Al_2O_3$/$SrCO_3$ of 2) treated at 1000° C. for 2 hours in $N_2$—$H_2$ by means of a molten salt process for a salt:(SrAl$_2$O$_4$:Eu,Dy) ratio of 3:1 and FIG. 18(c-d) show the TEM micrographs when 5% ZnO is furthermore incorporated.

Figure 19:
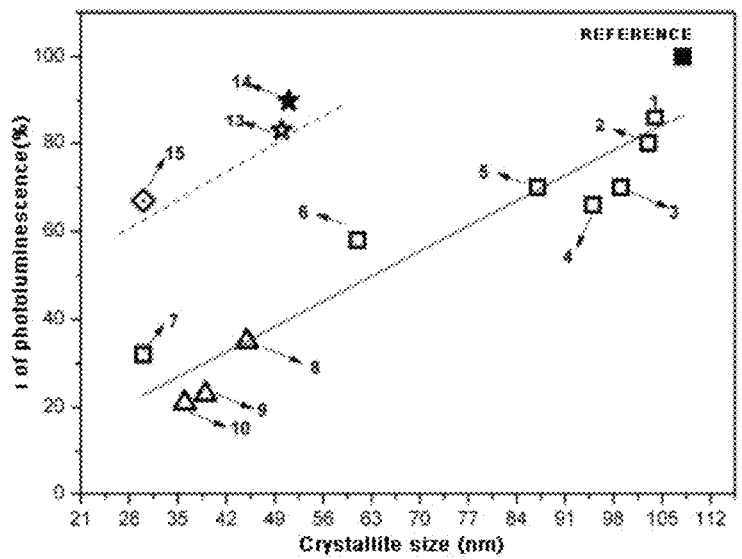

FIG. 19 shows the % of photoluminescence intensity as a function of the crystallite size for the initial reference material and after grinding by means of low-energy dry milling (LEDM) for (1)5, (2)10, (3)20 and (4)40 minutes, by means of high-energy dry milling (LEDM) for (5)5, (6)10 and (7)25 minutes and of the SrAl$_2$O$_4$-based material synthesized by means of combustion synthesis with different urea contents (8-10), and of the materials synthesized by means of a molten salt process referred to as (11) SAO MS 6 μm Al$_2$O$_3$ (Al/Sr: 1), (12) SAO MS 6 μm Al$_2$O$_3$ (Al/Sr: 2) and (13) SrAl$_2$O$_4$:Eu,Dy pigment of Example 4(Al$_2$O$_3$/SrCO$_3$ of 2)+5% ZnO.

Figure 20:
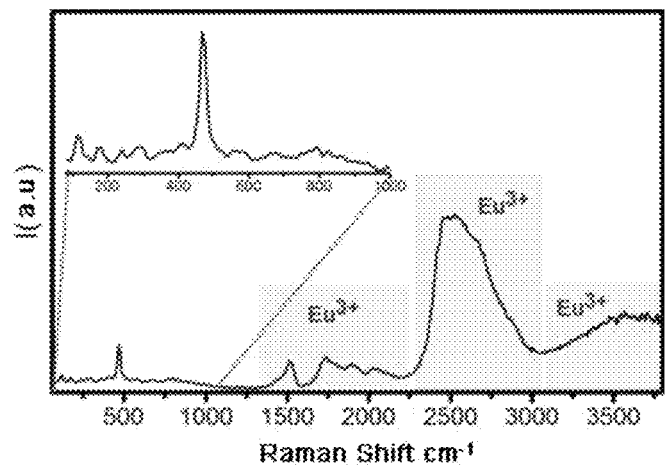

FIG. 20 shows the Raman Spectrum of the reference material.

Figure 21:
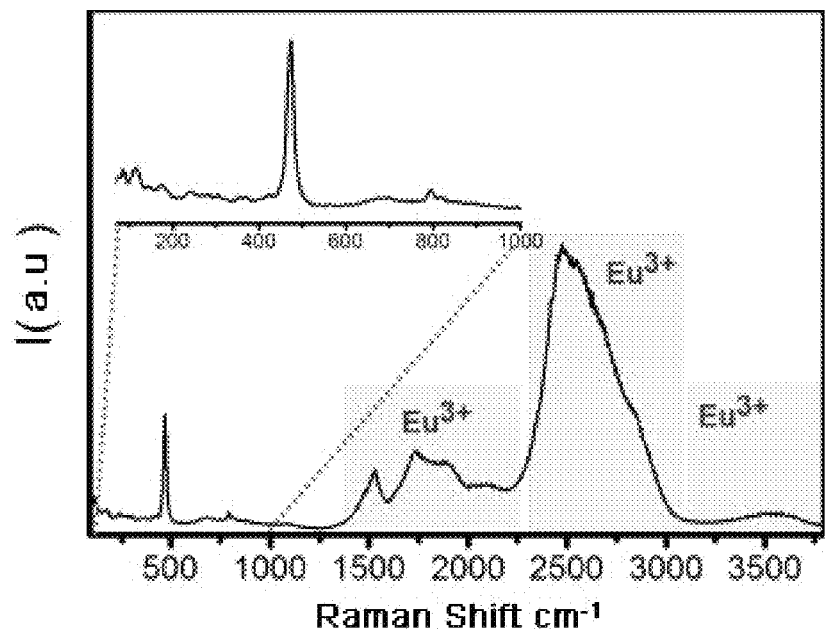

FIG. 21 shows the Raman Spectrum of the material SrAl$_2$O$_4$:Eu,Dy synthesized by means of a molten salt process with a salt:(SrAl$_2$O$_4$:Eu,Dy) ratio of 3:1 synthesized from alumina of 6 μm for 2 hours in a N$_2$—H$_2$ atmosphere using a temperature of 1000° C. and using an Al$_2$O$_3$/SrCO$_3$ ratio of 1.

Figure 22:
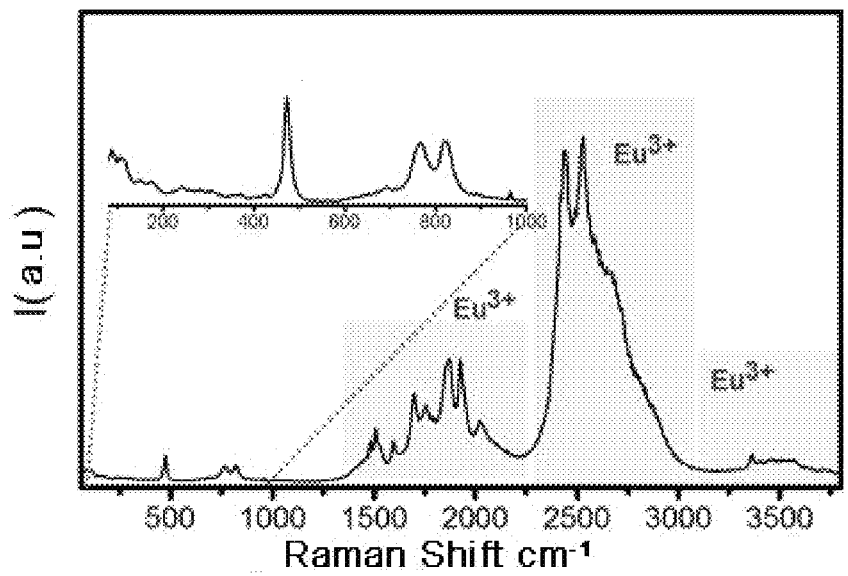

FIG. 22 shows the Raman Spectrum of the material SrAl$_2$O$_4$:Eu,Dy synthesized by means of a molten salt process with a salt:(SrAl$_2$O$_4$:Eu,Dy) ratio of 3:1 synthesized from alumina of 0.1 μm for 2 hours in an atmosphere consisting of air using a temperature of 1400° C. and using an Al$_2$O$_3$/SrCO$_3$ ratio of 1.

Figure 23:
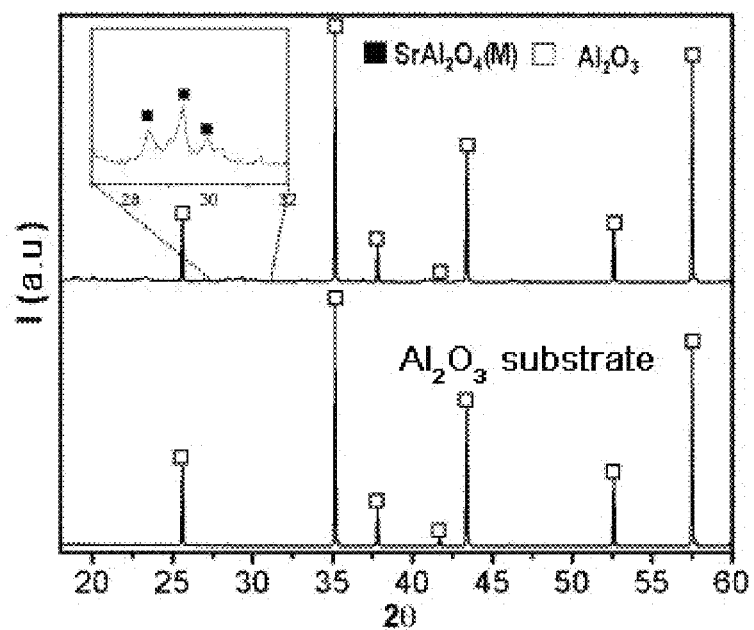

FIG. 23 shows the X-ray diffraction of the Al$_2$O$_3$ substrate (diffractogram located at the bottom) and the thin SrAl$_2$O$_4$:Eu,Dy film obtained by silk screen printing on the Al$_2$O$_3$ substrate and treated at 1000° C. for 2 hours in a N$_2$—H$_2$ atmosphere (diffractogram located at the top).

Figure 24:
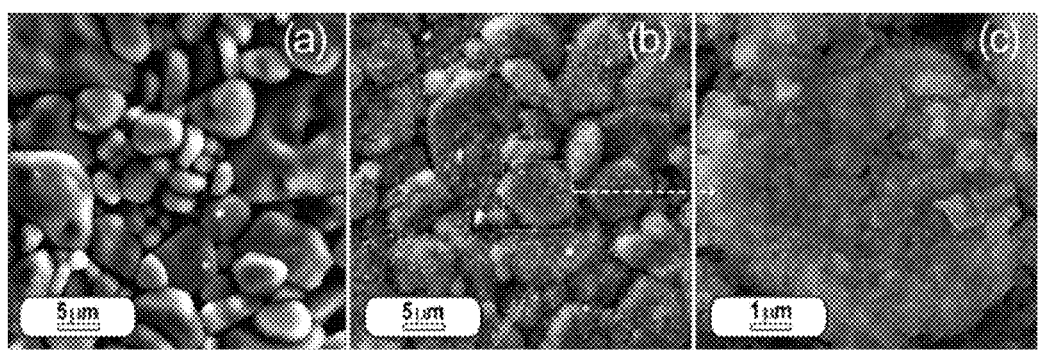

FIG. 24(a) shows the FE-SEM micrographs of the Al$_2$O$_3$ substrate and FIG. 24(b and c) show the thin SrAl$_2$O$_4$:Eu,Dy film obtained by silk screen printing on the Al$_2$O$_3$ substrate and treated for 2 hours in a N$_2$—H$_2$ atmosphere using a temperature of 1000° C.

Figure 25:
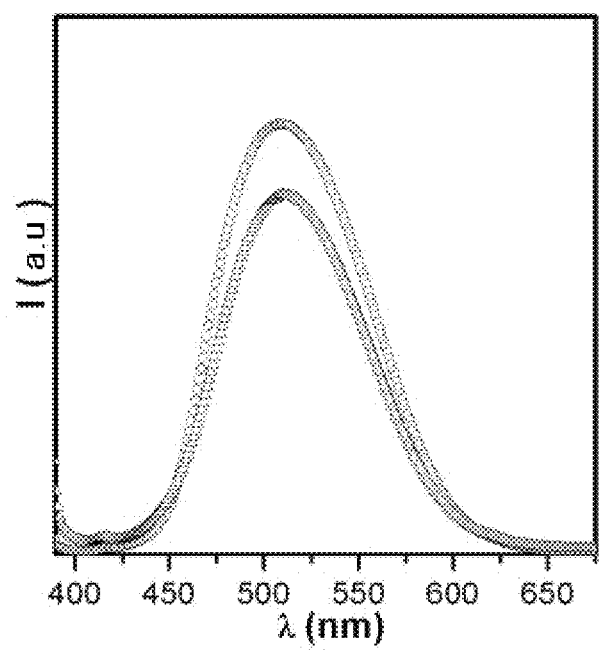

FIG. 25 shows the emission spectrum ($\lambda_{EXC}$=380 nm) of the reference material (line with open circles) and the thin SrAl$_2$O$_4$:Eu,Dy film obtained (line with open triangles).

Figure 26:
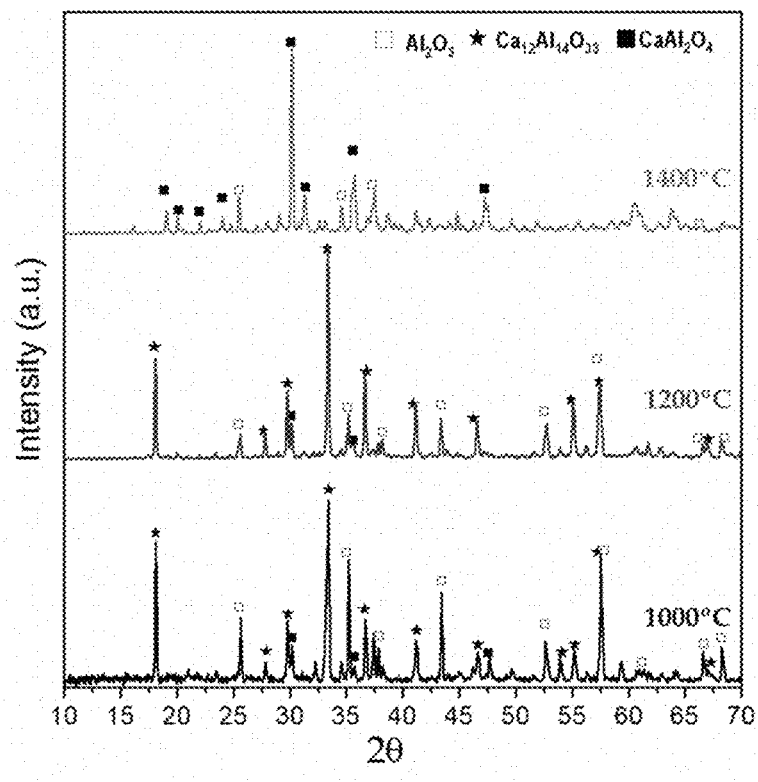

FIG. 26 shows the diffractogram of the synthesized material based on CaAl$_2$O$_4$:Eu, Nd at 1000, 1200 and 1400° C. for 2 hours in N$_2$—H$_2$ for a salt:(CaAl$_2$O$_4$:X) ratio corresponding to 3:1 using as α-Al$_2$O$_3$a having a particle size of 6 μm precursor alumina. The symbols highlight Al$_2$O$_3$ (open squares), CaAl$_2$O$_4$ (black squares) and Ca$_{12}$Al$_{14}$O$_{33}$ (starts).

Figure 27:
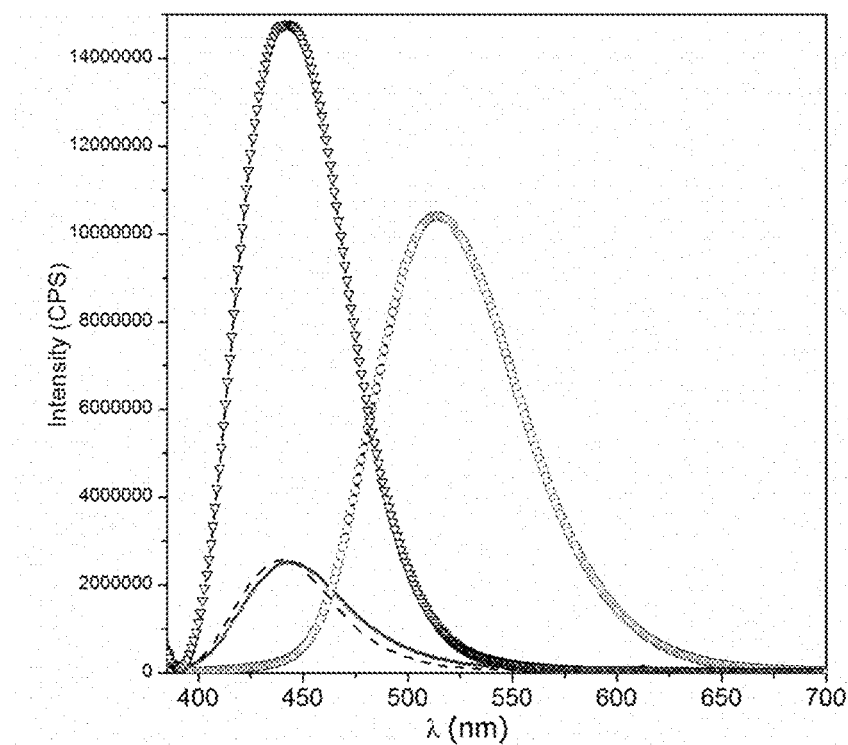

FIG. 27 shows the emission spectrum (AEXC=380 nm) of the reference material based on SrAl$_2$O$_4$:Eu,Dy (line with circles) and the material CaAl$_2$O$_4$:Eu,Nd synthesized by means of a molten salt process with a salt:(CaAl$_2$O$_4$:Eu,Nd) ratio of 3:1 synthesized from alumina of 6 μm for 2 hours in a N$_2$—H$_2$ atmosphere using a temperature of 1000 (dashed line), 1200 (solid line) and 1400° C. (line with triangles).

Figure 28:
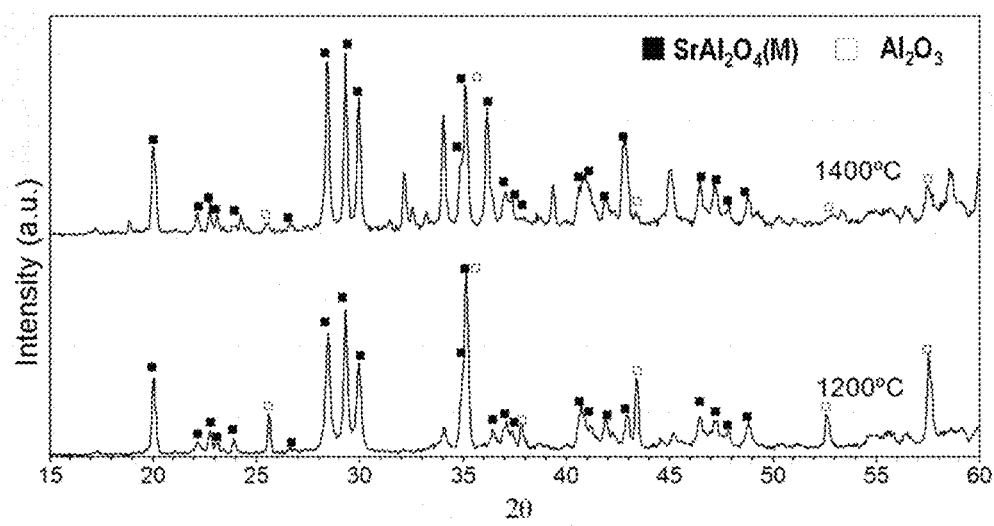

FIG. 28 shows the diffractogram of the synthesized material based on SrAl$_2$O$_4$:Eu,Dy at 1200 and 1400° C. for 2 hours in N$_2$—H$_2$ for a salt:(SrAl$_2$O$_4$:X) ratio corresponding to 3:1 using as α-Al$_2$O$_3$ having a particle size of 6 μm precursor alumina. The symbols highlight Al$_2$O$_3$ (open squares) and SrAl$_2$O$_4$ (Monoclinic) (black squares).

Figure 29:
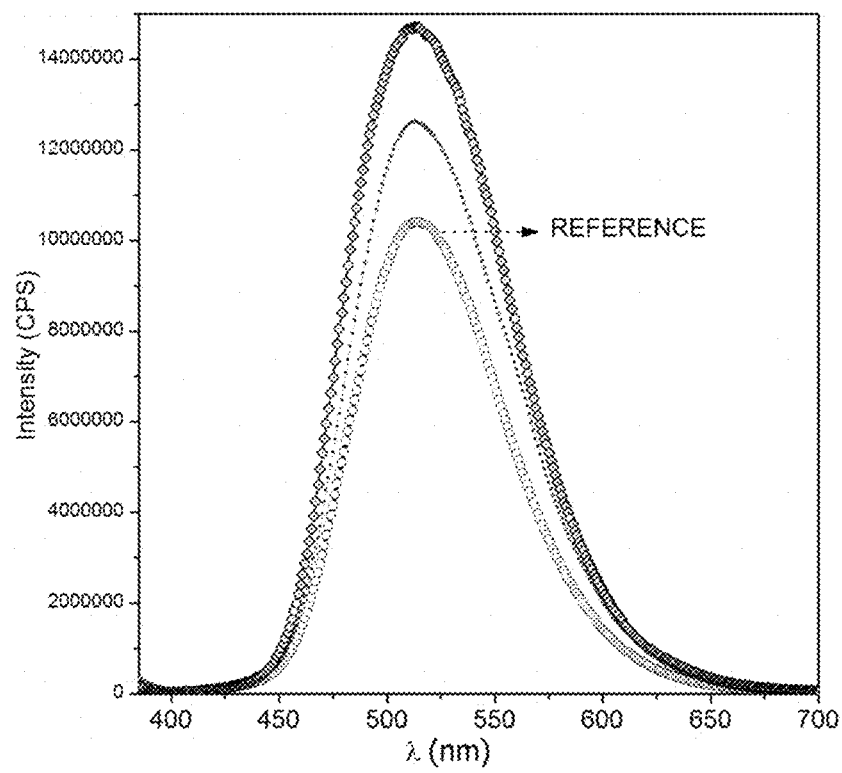

FIG. 29 shows the emission spectrum ($\Delta_{EXC}$=380 nm) of the reference material based on SrAl$_2$O$_4$:Eu,Dy (line with circles) and the material SrAl$_2$O$_4$:Eu,Nd synthesized by means of a molten salt process with a salt:(SrAl$_2$O$_4$:Eu,Dy) ratio of 3:1 synthesized from alumina of 6 μm for 2 hours in a N$_2$—H$_2$ atmosphere using a temperature 1200 (line with starts) and 1400° C. (line with diamonds).

Figure 30:
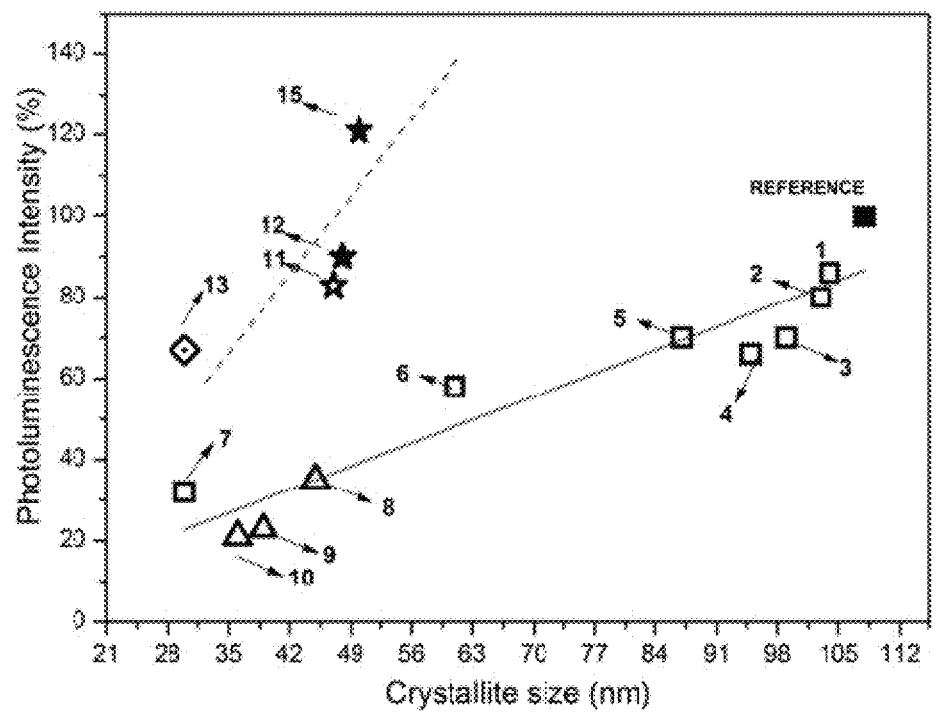

FIG. 30 shows the % of photoluminescence intensity as a function of the crystallite size for the initial reference material and after grinding by means of low-energy dry milling (LEDM) for (1)5, (2)10, (3)20 and (4)40 minutes, by means of high-energy dry milling (LEDM) for (5)5, (6)10 and (7)25 minutes and of the SrAl$_2$O$_4$-based material synthesized by means of combustion synthesis with different urea contents (8-10), and of the materials synthesized by means of a molten salt process referred to as (11) SAO MS 6 μm Al$_2$O$_3$ (Al/Sr: 1), (12) SAO MS 6 μm Al$_2$O$_3$ (Al/Sr: 2) and (13) SrAl$_2$O$_4$:Eu,Dy pigment of Example 4 (Al$_2$O$_3$/SrCO$_3$ of 2)+5% ZnO, and SAO MS 6 μm Al$_2$O$_3$ (Al/Sr: 2) at (14) 1200 and (15) 1400° C. of Example 11.

Figure 31:
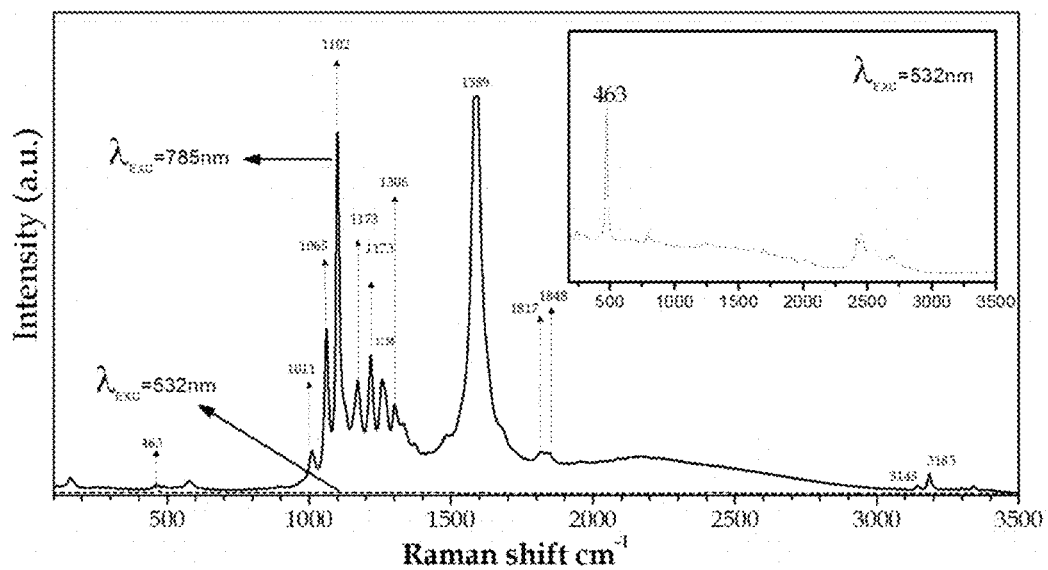

FIG. 31 shows the Raman Spectra of the material SrAl$_2$O$_4$:Eu,Dy synthesized by means of a molten salt process with a salt:(SrAl$_2$O$_4$:Eu,Dy) ratio of 3:1 synthesized from alumina of 6 μm for 2 hours in a N$_2$—H$_2$ atmosphere using a temperature of 1400° C. and using an Al$_2$O$_3$/SrCO$_3$ ratio of 2, obtained for two different excitation lines at 532 (dashed line) and 785 (solid line) nm.

DETAILED DESCRIPTION OF THE INVENTION

Unless otherwise defined, all the technical and scientific terms used in this article have the same meaning as those commonly understood by a person skilled in the art to which this description belongs.

Phosphorescent Pigment

The present invention relates to a nanostructured phosphorescent pigment comprising an Al$_2$O$_3$ substrate; MAl$_2$O$_4$:X nanocrystals, where M is a cation selected from Ca$^{2+}$, Sr$^{2+}$, Ba$^{2+}$, Mg$^{2+}$, Zn$^{2+}$ and combinations thereof, and where X is a cation selected from Eu$^{2+}$, Dy$^{3+}$, Nd$^{3+}$, Er$^{3+}$, La$^{3+}$, Lu$^{3+}$, Ce$^{3+}$, Y$^{3+}$, Sm$^{3+}$, Gd$^{3+}$, Tb$^{3+}$, Tm$^{3+}$, Yb$^{3+}$ and combinations thereof, disposed on the Al$_2$O$_3$ substrate; and nanocrystals of salt used in a molten salt process disposed on the MAl$_2$O$_4$:X nanocrystals.

The term "phosphorescent pigment" refers to a material absorbing and storing energy when exposed to an excitation source for subsequently emitting same in the form of light with a half-life greater than 0.1 s. Among phosphorescent pigments are the so-called "prolonged persistence" pigments emitting light once the excitation has ceased since the absorbed energy is released in a slow and continuous manner.

In a particular embodiment, the phosphorescent pigment of the present invention is a prolonged persistence phosphorescent pigment.

The nanostructured phosphorescent pigment of the present invention can have different particle morphologies. Non-limiting examples of the morphology of the nanostructured phosphorescent pigment of the present invention are particles having a pseudo-spherical, laminar and pseudo-hexagonal morphology.

Without being bound to any particular theory, it is believed that the final morphology of the nanostructured phosphorescent pigment of the present invention depends on the nature of the starting Al$_2$O$_3$ substrate.

The starting Al$_2$O$_3$ substrate can have a crystalline structure, such as for example, α-Al$_2$O$_3$, γ-Al$_2$O$_3$, α-Al(OH)$_3$ or γ-AlO(OH) or a polycrystalline structure. In a preferred embodiment, the Al$_2$O$_3$ substrate is α-Al$_2$O$_3$.

The starting Al$_2$O$_3$ substrate can have a macroscopic particle, sheet or fiber structure. In a preferred embodiment, the $Al_2O_3$ substrate of the nanostructured phosphorescent pigment of the present invention has a particle structure.

In another preferred embodiment, the nanostructured phosphorescent pigment of the present invention has a particle size ≤10 µm, preferably ≤0.5 µm.

The nanostructured phosphorescent pigment of the present invention further comprises $MAl_2O_4$:X nanocrystals, where M is a cation selected from $Ca^{2+}$, $Sr^{2+}$, $Ba^{2+}$, $Mg^{2+}$, $Zn^{2+}$ and combinations thereof, and where X is a cation selected from $Eu^{2+}$, $Dy^{3+}$, $Nd^{3+}$, $Er^{3+}$, $La^{3+}$, $Lu^{3+}$, $Ce^{3+}$, $Y^{3+}$, $Sm^{3+}$, $Gd^{3+}$, $Tb^{3+}$, $Tm^{3+}$, $Yb^{3+}$ and combinations thereof, disposed on the $Al_2O_3$ substrate. In a preferred embodiment, M is Sr. In another preferred embodiment, X is selected from $Eu^{2+}$, $Dy^{3+}$ and combinations thereof.

The term "nanostructured" refers to materials made up of crystals having size comprised between 1 and 1000 nm. In the context of the present invention, the sizes of "crystal" or "crystallite" are preferably determined from the Scherrer formula. The $MAl_2O_4$:X nanocrystals of the nanostructured phosphorescent pigment of the present invention have a crystal size 1000 nm.

In a preferred embodiment, the $MAl_2O_4$:X nanocrystals of the nanostructured phosphorescent pigment of the present invention have a crystal size 500 nm, even more preferably between 10 nm and 300 nm.

In a particular embodiment, the $MAl_2O_4$:X nanocrystals of the nanostructured phosphorescent pigment of the present invention forms a thin film on the $Al_2O_3$ substrate, preferably with a thickness 3 µm. Said film can be a continuous or discontinuous film.

The formulation of the aluminates of the pigment of the present invention is expressed as $MAl_2O_4$:X where M is a divalent cation and X is a cation referred to as dopant. The term "dopant" refers to an element or compound added to a material for changing a property of the pure material. In the context of the present invention, the dopant X is added in substitution of the divalent cation M to attain an optically active material.

In a preferred embodiment, X in $MAl_2O_4$:X is in a molar proportion of less than 0.5%.

The nanostructured phosphorescent pigment of the present invention further comprises nanocrystals of salt used in a molten salt process disposed on the $MAl_2O_4$:X nanocrystals. The nanocrystals of salt used in a molten salt process are located in the interstices between the $MAl_2O_4$:X nanocrystals or on the surface thereof.

In a particular embodiment, the crystals of salt used in a molten salt process are isolated on the surface of the $MAl_2O_4$:X crystals and have a fibrillar-type morphology with sizes less than 50 nm.

In a particular embodiment, the salt used in a molten salt process of the nanostructured phosphorescent pigment of the present invention is selected from chlorides, sulfurs and mixture thereof. Even more preferably, the salt used in a molten salt process of the nanostructured phosphorescent pigment of the present invention is selected from $Na_2SO_4$, $K_2SO_4$, $Li_2SO_4$, NaCl, KCl, LiCl and mixtures thereof.

The salt used in a molten salt process of the nanostructured phosphorescent pigment of the present invention can also be a eutectic mixture of the salts defined above. The term "eutectic mixture" refers to a mixture of two components with minimum melting point (solidification) or boiling point (liquefaction), less than that corresponding to each of the compounds in pure state. This occurs in mixtures having a high stability in liquid state, the components of which are insoluble in solid state.

In a particular embodiment, the salt used in a molten salt process of the phosphorescent pigment of the present invention is a eutectic mixture. In an even more preferred embodiment, the salt used in a molten salt process of the phosphorescent pigment of the present invention is a eutectic mixture of 0.5 NaCl-0.5 KCl (referred to as: $(NaCl/KCl)_e$).

The authors of the present invention have observed that the luminescence of the nanostructured phosphorescent pigment of the present invention is greater the higher the salt content included in the mixture of starting materials in the method for preparing the pigment of the present invention. Without being bound to any particular theory, it is believed that this phenomenon is due to more $MAl_2O_4$:X nanocrystals being formed and to the doping cations diffusing better in the crystalline $MAl_2O_4$:X structure. Therefore, in a particular embodiment the salt:$(MAl_2O_4$:X) molar ratio in the nanostructured phosphorescent pigment of the present invention is comprised between 1:1 and 5:1. In a preferred embodiment, the salt:$(MAl_2O_4$:X) molar ratio in the nanostructured phosphorescent pigment of the present invention is 3:1.

The phosphorescent properties of the pigment of the present invention are evaluated by means of the techniques known by the person skilled in the art, such as for example, emission spectra and phosphorescence decay curves in comparison with reference materials. The reference material is a material which has a high photoluminescence signal and is taken as a comparative reference and represents 100% of the signal.

The authors of the present invention have observed that the phosphorescent pigment of the present invention has greater luminescence with respect to that described in the state of the art for the same range of aluminate nanocrystal size. For example, it has been observed that the nanostructured phosphorescent pigment of the present invention $SrAl_2O_4$:Eu,Dy has a phosphorescent signal intensity of 80% for crystallite size of ~45 nm and 60% for crystallite size of ~28 nm, using a micrometric commercial material $SrAl_2O_4$:Eu,Dy with pigment particle size of 20 µm and crystal size of ~100 nm as reference material. This reference material ground to a particle size of 5 µm and crystallite size of 70 nm has photoluminescence values of 60% and photoluminescence values <30% for crystallite size <40 nm.

Without being bound to any particular theory, it is believed that the increase of phosphorescent signal is due to quantum confinement processes favored by the existence of salt nanocrystallizations on the surface of aluminate nanocrystals and the crystalline strength exerted by the alumina support on which the nanocrystals grow.

In a particular embodiment, the phosphorescent pigment of the present invention emits at a wavelength of about 510 nm.

Additionally, this quantum confinement effect also translate into an increase of Raman modes relating to defects in the crystalline structure which translate into unique signs that can be detected by means of Raman spectroscopy. In a particular embodiment, the nanostructured phosphorescent pigment of the present invention has Raman peaks between 720 and 860 $cm^{-1}$, preferably Raman peaks in 768 and 821 $cm^{-1}$.

In a particular embodiment, the nanostructured phosphorescent pigment of the present invention further comprises an outer layer comprising hybrid silica nanoparticles. The term "hybrid silica nanoparticles" refers to nanoparticles prepared from an organic silica precursor (for example, tetraethylorthosilicate, TEOS) by means of the sol-gel technique widely known by the person skilled in the art and maintaining the organic phase of the precursor.

The outer layer of the pigment of the invention can be a continuous or discontinuous layer, preferably discontinuous. The presence of this outer layer increases the phosphorescent signal as well as the resistance of the nanostructured pigment of the invention against attack by water.

Method for Preparing the Pigment of the Invention

Another aspect of the present invention relates to a method for preparing the nanostructured phosphorescent pigment as defined above comprising the steps of i) mixing starting materials comprising a cation M precursor, a cation X precursor, $Al_2O_3$ and a salt used in a molten salt process; and ii) heating the mixture resulting from step (i) in reducing atmosphere.

By means of the preparation method of the present invention, the aluminate nanocrystals are formed on the surface of the alumina substrate. Without being bound to any particular theory, it is believed that the formation process corresponds to a growth mechanism following a standard or template. Mechanism of this type results from the difference between the diffusion coefficients of the different species involved, in this case the cations $M^{2+}$ and $Al^{3+}$, the $M^{2+}$ cation being more superior than the $Al^{3+}$ cations.

In a preferred embodiment, the $Al_2O_3$:precursor molar ratio of the cation M of the starting materials is comprised between 1 and 2.

In a particular embodiment, the starting materials of step i) further comprise a mineralizing agent. In the context of the present invention, the term "mineralizing agent" refers to a compound which is added to the solid mixture of starting materials to favor diffusion and incorporation of cations X in the aluminate structure. The amount of mineralizing agent must be in the aluminate solid solution limit, i.e., at a concentration that does not cause the formation of different crystalline aluminate structures. In a preferred embodiment, the mineralizing agent of step i) is ZnO.

In a particular embodiment, the mixing of step i) is performed by means of dry milling.

In a particular embodiment, step i) further comprises sieving after mixing the starting materials.

In a particular embodiment, the starting materials of step i) are subjected to a grinding and homogenization process before mixing to obtain an optimal particle size.

In a preferred embodiment, the particle size of the starting materials is less than 6 μm.

Non-limiting examples of cation M and X precursors are carbonates, hydroxides, nitrates, and chlorides, preferably carbonates.

In a preferred embodiment, step i) of the preparation method of the present invention comprises an $Al_2O_3$:cation M precursor molar ratio 2.

In a preferred embodiment, the heating of step ii) of the preparation method of the present invention is performed at a temperature between 900° and 1400° C., preferably at 1000° C.

In another preferred embodiment, step ii) of the preparation method of the present invention comprises a reducing $N_2$—$H_2$ atmosphere.

In a particular embodiment, the method for preparing the nanostructured phosphorescent pigment of the present invention comprises a step iii) of adding an ethanol/water solution of a silica precursor and an acid on the material resulting from step ii).

Non-limiting examples of silica precursors suitable for the method of the present invention are silicon alkoxides such as tetraethylorthosilicate (TEOS), methyltrimethoxysilane (MTMOS), 3-glycidyloxypropyltrimethoxysilane (GPTMS), vinyltriethoxysilane (VTES) or combinations thereof.

Hydrolysis of the silica precursor with an acid as catalyst occurs in step iii). Non-limiting examples of acids suitable for step iii) of the method of the invention are hydrochloric acid or sulfuric acid.

In another preferred embodiment, the molar ratio between the reagents in step iii) of the method follows the following equation 1TEOS:xEtOH:$4H_2O$:0.02 acid, where x=8 or 16.

In another preferred embodiment, the TEOS:$H_2O$ molar ratio in step iii) of the method is 1:2.

In another particular embodiment, step iii) further comprises adding an additive.

Non-limiting examples of additives are dispersing agents, such as for example, a polyacrylic acid, surface active agents, such as for example, polyether-modified polydimethylsiloxane, or dry retarding agents, such as for example, glycerol.

Another aspect of the present invention relates to a nanostructured phosphorescent pigment obtainable by the method of preparation as defined above, where said pigment comprises: an $Al_2O_3$ substrate; $MAl_2O_4$:X nanocrystals, where M is a cation selected from $Ca^{2+}$, $Sr^{2+}$, $Ba^{2+}$, $Mg^{2+}$, $Zn^{2+}$ and combinations thereof, and where X is a cation selected from $Eu^{2+}$, $Dy^{3+}$, $Nd^{3+}$, $Er^{3+}$, $La^{3+}$, $Lu^{3+}$, $Ce^{3+}$, $Y^{3+}$, $Sm^{3+}$, $Gd^{3+}$, $Tb^{3+}$, $Tm^{3+}$, $Yb^{3+}$ and combinations thereof, disposed on the $Al_2O_3$ substrate; and nanocrystals of salt used in a molten salt process disposed on the $MAl_2O_4$:X nanocrystals.

As can be seen, the phosphorescent pigment obtained by means of the method of preparation as defined above comprises an aluminate crystal size in nanoscale and nanostructured pigment particle sizes <10 μm, having an optimum phosphorescence and unique Raman signals.

Applications of the Pigment of the Invention

The authors of the present invention have observed that the developed nanostructured phosphorescent pigment has greater phosphorescence and looks whiter with respect to that described in the state of the art for the same range of aluminate nanocrystal size. These properties provide more versatility to the applications of the pigment of the present invention.

Therefore, another aspect of the present invention relates to the use of the nanostructured phosphorescent pigment as defined above for signaling, illumination, decoration or authentication.

The phosphorescent pigment of the invention can be found forming part of the structure per se (as a component or ink) or as a coating (paint or varnish) of the object the signaling, illumination, decoration or authentication thereof is to be achieved.

The term "signaling" refers to indicating or marking by means of emergency, safety or road signs any danger, warning, fire, position of fire extinguishing equipment, threats, evacuation routes and emergency exits, hazardous areas, traffic regulations, etc.

The term "illumination" refers to lighting an element in low light conditions. Non-limiting examples in which the pigment of the present invention can be used for illumination are keypads of electronic devices, structural components of automobiles or other means of transport, or forming part of cosmetic compositions to provide a skin brightening or whitening effect.

The term "decoration" refers to the incorporation of a phosphorescent pigment for the purpose of producing an esthetic effect on an object. Non-limiting examples in which the phosphorescent pigment of the present invention can be used for decoration is in the textile sector or in construction.

The term "authentication" refers to making sure the authenticity, origin or function of an article or product. The authors of the present invention have furthermore observed that the developed nanostructured phosphorescent pigment has unique Raman signals. This allows it to be detected by means of combination of Raman spectroscopy and fluorometry.

Therefore, the invention also relates to a security article comprising the nanostructured phosphorescent pigment as defined above for ensuring its authenticity, origin or function.

Likewise, the incorporation of at least two pigments with different $MAl_2O_4$:X nanocrystal size gives rise to different phosphorescent and Raman responses, which allows establishing an identification code of the security article.

In a particular embodiment, the security article comprises at least two nanostructured phosphorescent pigments as defined above with different $MAl_2O_4$:X nanocrystal size.

The term "security article" refers to any article of the authenticity of which is to be assured or the origin or function of which is to be determined, such as security paper, an envelope, a check, a promissory note, a banknote, an identity card, a passport, a ticket, a seal, a pass, a certificate, tags or label identifying pharmaceutical products, textiles, electronic devices, jewelry, works of art, tobacco, alcoholic beverages or CD/DVDs. The nanostructured phosphorescent pigment of the present invention can be integrated both in the mass of the security article and on its surface or as a surface coating.

The term "security article" also includes security documents such that a security article can comprise or consist of one or more security documents. A "security document" is therefore a security article which is formed by a specific substrate usually in paper or plastic format, whereas the security article can generally contain very different substrates, including paper or plastic.

In a particular embodiment, the security article comprising the nanostructured phosphorescent pigment as defined above integrated therein is a security document.

The term "security article" also includes security elements such that a security article can comprise or consist of one or more security elements. The term "security element" refers to an element which is integrated in a security document or article for the purpose of authenticating same.

In a particular embodiment, the present invention relates to a security article comprising the nanostructured phosphorescent pigment as defined above where the pigment is integrated inside a security element.

An example of security article is a passport (formed by different substrates such as cardboard, paper, plastic film, chip) containing a collection of security documents (or articles) (page containing the identification data, inside pages for visas, etc) and security elements (for example, fluorescent thread for sewing the book). In turn, the mentioned security documents integrating same (pages containing data) can have several security elements (fluorescent fibrils in the mass of the paper, security thread in the inside pages, printed inks, adhered holographic sheets, etc). An example of security article formed by a specific substrate, for example a piece of paper, can be a check having affixed thereon the signature of the owner of the money to be withdrawn from the banking entity and other related data with other information pre-printed thereon. Said check is considered a document. This document can contain different security elements in the mass of the paper or on the surface thereof from printing with the security inks used, etc.

EXAMPLES

The present invention will now be described by means of examples which serve to illustrate performing and testing of illustrative embodiments. However, it is understood that the present invention is in no way limited to the following examples.

Example 1: Reference Material Characterization

The commercial $SrAl_2O_4$:Eu,Dy-based material was referred to as "reference material" and was supplied by Jinan Chenghao Technology Co., Ltd.

The phosphorescence of the material was measured with a Flurolog 3 spectrofluorometer (FL32iHR, Horiba Jobin Yvon) equipped with a 450 W xenon lamp as the excitation source. The emission spectrum for the reference material was acquired by causing the excitation of the sample with an excitation wavelength equal to 380 nm ($\lambda_{EXC}$=380 nm). The sample in the form of power was put in a quartz cuvette and the incident radiation was focused on the surface of the sample. The monochromatic radiation obtained was directed towards a semi-transparent mirror, where 10% of the intensity was collected by a photodiode (Signal R, Units: mA). The radiation went through a second monochromator (emission monochromator) and was collected with a R2658P photomultiplier (Hamamatsu) (Signal S, Units: cps ("counts per second")). The signal considered was the signal recorded as S/R (cps/mA) since the linear response of the photomultiplier and photodiode is verified in this signal.

Figure 1:
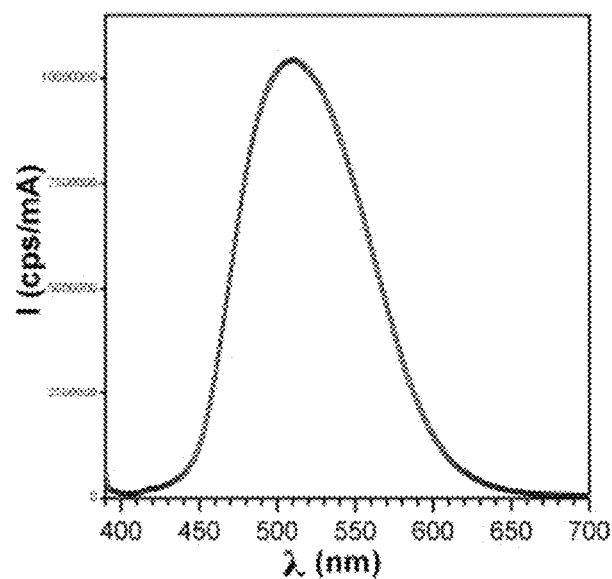
FIG. 1 shows the emission spectrum ($\lambda_{EXC}$=380 nm) of the reference material.
Figure 2:
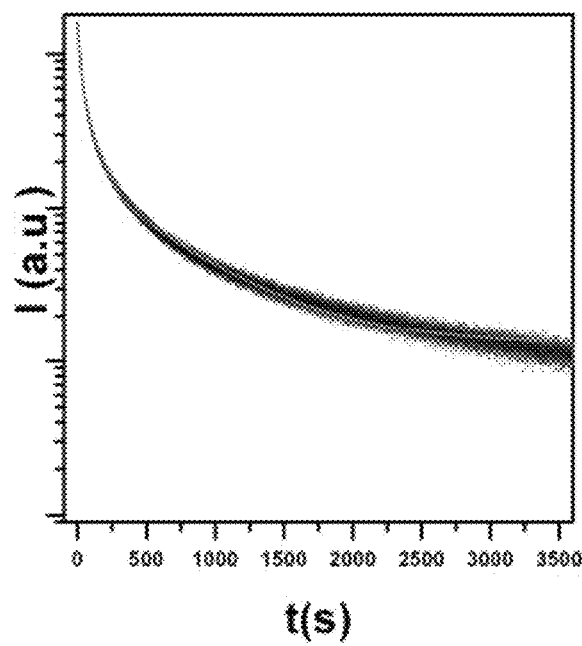
FIG. 2 shows the luminescence decay curve of the commercial reference material setting the emission at 510 nm.

The reference material had a centered wide emission band of about $\lambda$=510 nm (green) corresponding to the allowed spin transition $4f^65d^1 \rightarrow 4f^7(^8S_{7/2})$ of $Eu^{2+}$ (FIG. 1). The phosphorescence decay curves were obtained by means of excitation of the sample with radiation at $\lambda_{EXC}$=380 nm for a period of 10 minutes and by interrupting the excitation. The luminescence decay curve (FIG. 2) was set for a $\lambda_{EM}$=510 nm and the initial intensity acquired corresponds with the intensity collected 1 minute after the excitation was interrupted. The signal (Signal S, Units: cps) was collected. The intensity collected after 1 minute corresponds with 158950 cps and the intensity collected subsequently after 1 hour corresponds with 1287 cps.

The luminance value ($cd/m^2$) of the material was obtained by means of an LS-100 luminance meter of Konica Minolta following the DIN 67510-1 standard and by activating the material by means of an OSRAM lamp (XB04450W) simulating the conditions of 1 solar luminosity (1367 W $m^{-2}$). The intensity collected 1 minute after interruption of excitation corresponds to 30 $cd/m^2$.

The reference material was ground by means of the high-energy dry milling (HEDM) process for 5, 10 and 25 minutes and by means of a low-energy dry milling (LEDM) process described in [Rojas-Hernandez, R. E. et al. *RSC Adv.* 2015, 5, 42559]. A photoluminescence intensity of 10.42 $E^{+06}$ (cps/mA) is obtained for the reference material.

Figure 3:
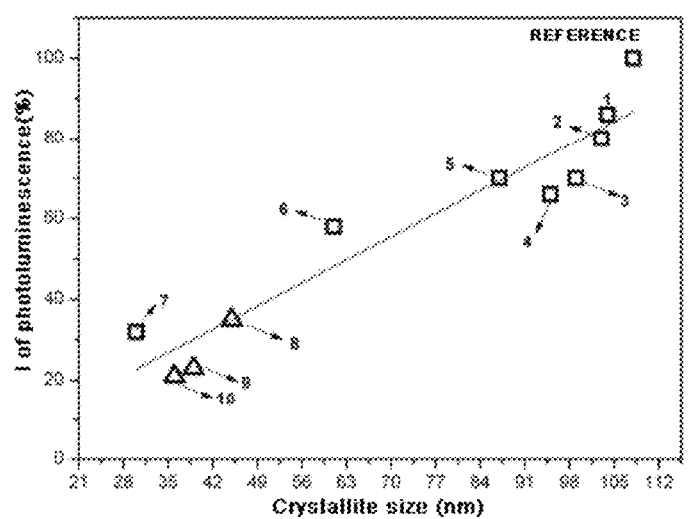
FIG. 3 shows the % of photoluminescence intensity as a function of the crystallite size for the reference material and after grinding by means of low-energy dry milling (LEDM) for (1)5, (2)10, (3)20 and (4)40 minutes, by means of high-energy dry milling (LEDM) for (5)5, (6)10 and (7)25 minutes and of the material synthesized by means of combustion synthesis with different urea contents (8-10).

FIG. 3 depicts the % of photoluminescence intensity as a function of the crystallite size. 100% of photoluminescence intensity corresponds to that of the reference material. Data of comparative $SrAl_2O_4$-based materials synthesized by means of combustion synthesis with different urea contents [Rojas-Hernandez, R. E. et al. *RSC Adv.* 2015, 5, 4, 3104-

[3112] is also incorporated in FIG. 3. A decrease in photoluminescence intensity with a reduction of crystallite size was observed for the group of materials having the same chemical composition.

Example 2. $SrAl_2O_4$:Eu,Dy Synthesis and Characterization by Means of Synthesis in the Presence of Salts and $\alpha$-$Al_2O_3$a Having a Particle Size of 0.1 μm A pigment was synthesized by means of synthesis in the presence of a salt used in a molten salt process, $SrCO_3$, an alumina precursor ($\alpha$-$Al_2O_3$) having a particle size of 0.1 μm and rare earth precursors $Eu_2O_3$ and $Dy_2O_3$. A molar concentration of 0.02 of Eu and 0.01 of Dy was incorporated. The salt:($SrAl_2O_4$:X) ratio is comprised within a molar ratio of 1:1 to 5:1, preferably the ratio of 3:1. The materials were synthesized for 2 hours in a $N_2$—$H_2$ atmosphere using temperatures from 800 to 1200° C.

Figure 4:
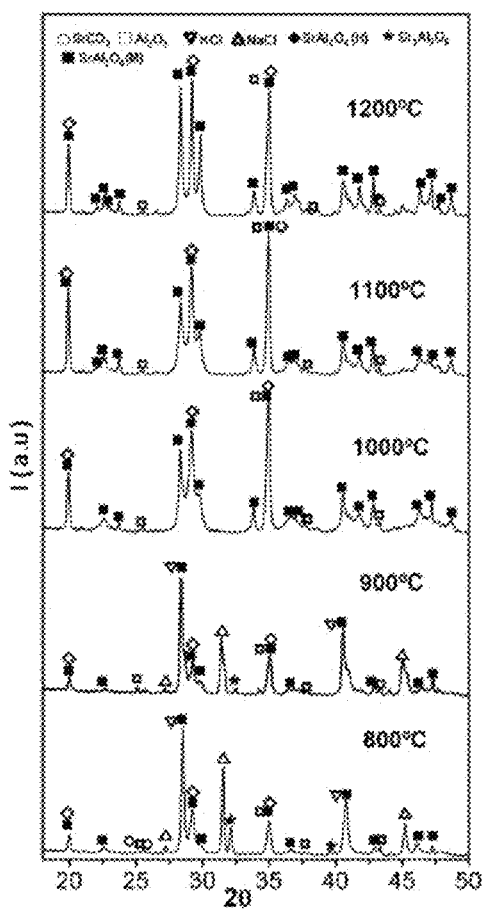
FIG. 4 shows the X-ray diffraction of the $SrAl_2O_4$:Eu,Dy pigment synthesized by means of a molten salt process with a salt:($SrAl_2O_4$:Eu,Dy) ratio of 3:1 synthesized for 2 hours in a $N_2$—$H_2$ atmosphere using temperatures from 800 to 1200° C.

FIG. 4 depicts the material synthesized using a salt:($SrAl_2O_4$:X) ratio of 3:1 at different synthesis temperatures. The diffractograms show the different crystalline phases present for each temperature.

Figure 5:
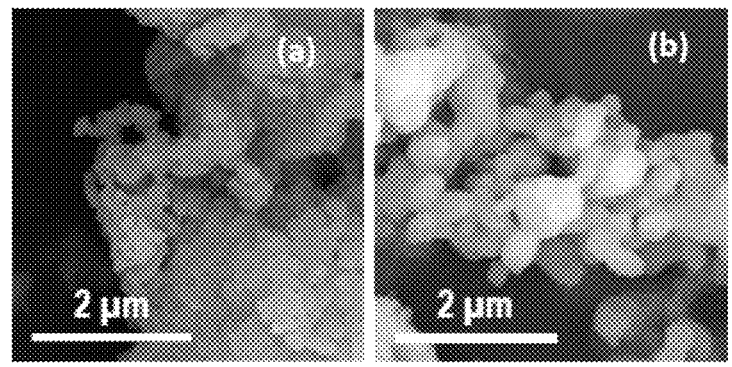
FIG. 5(a) shows the Field Emission Scanning Electron Microscopy (FE-SEM) micrographs of the $SrAl_2O_4$:Eu,Dy pigment synthesized by means of a molten salt process with a salt:($SrAl_2O_4$:Eu,Dy) ratio of 3:1 synthesized for 2 hours in a $N_2$—$H_2$ atmosphere using a temperature of 900° C. and a temperature of (b) 1000° C.

$SrCO_3$ breaks down completely after 900° C. The material synthesized at 900° C. (FIG. 5(a)) and 1000° C. (FIG. 5(b)) has a pseudo-spherical and polygonal morphology with a particle size 0.5 μm. Above 1100° C., the particle size increases and sintering necks start to be generated. Therefore, 900 and 1000° C. are established as the working range.

Figure 6:
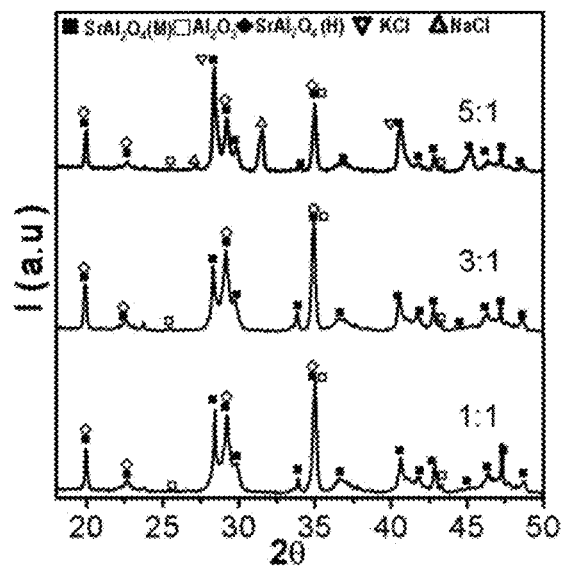
FIG. 6 shows the x-ray diffraction of the $SrAl_2O_4$:Eu,Dy pigment synthesized by means of a molten salt process with a salt:($SrAl_2O_4$:Eu,Dy) ratio of 1:1, 3:1 and 5:1 synthesized for 2 hours in a $N_2$—$H_2$ atmosphere using a temperature of 1000° C.
Figure 7:
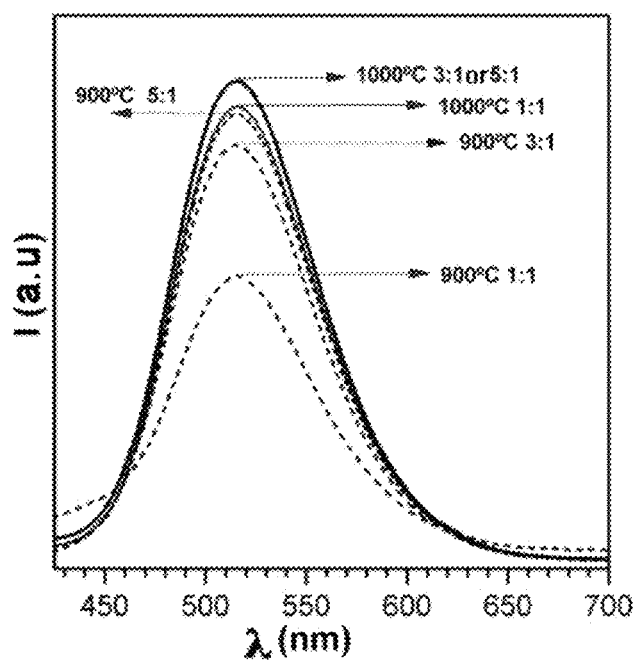
FIG. 7 shows the emission spectrum of the $SrAl_2O_4$:Eu, Dy pigment thermally treated at 900 and 1000° C. for 2 hours in $N_2$—$H_2$ atmosphere for a salt:($SrAl_2O_4$:Eu,Dy) ratio corresponding to 1:1, 3:1 and 5:1.
Figure 8:
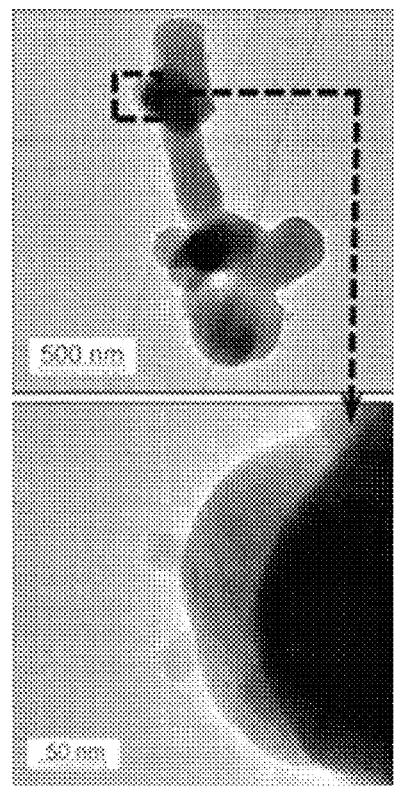
FIG. 8 shows the Transmission Electron Microscopy (TEM) micrographs of the $SrAl_2O_4$:Eu,Dy pigment treated at 1000° C. for 2 hours in a $N_2$—$H_2$ atmosphere for a salt:($SrAl_2O_4$:Eu,Dy) ratio corresponding to 3:1.

FIG. 6 shows the diffractograms of the synthesized material at 1000° C. using the different salt:($SrAl_2O_4$:X) ratios of 1:1, 3:1 and 5:1. The major phase corresponds with $SrAl_2O_4$, having a tridymite-type structure. FIG. 7 shows the emission spectra of the material treated at 900 and 1000° C. The material synthesized at 1000° C. has greater photoluminescence intensity. FIG. 8 shows the micrographs obtained by transmission electron microscopy (TEM) of the particles synthesized at 1000° C. for 2 hours in $N_2$—$H_2$ for a salt:($SrAl_2O_4$:X) ratio corresponding to 3:1. Small filaments or rods coming out of the particles having a spherical morphology are distinguished in the micrograph with higher magnification. From chemical analyses of the synthesized material by means of energy dispersive spectroscopy (EDX), growth of this type is attributed to salt nanocrystallizations.

Figure 9:
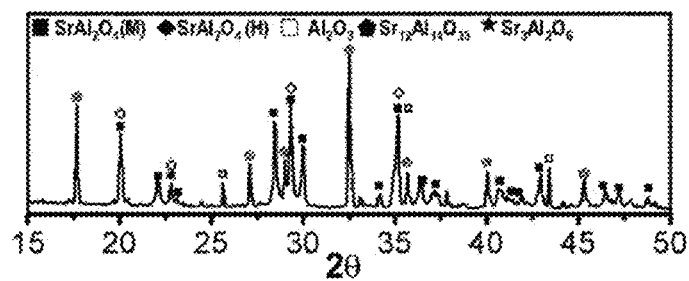
FIG. 9 shows the X-ray diffraction of the $SrAl_2O_4$:Eu,Dy pigment synthesized by means of a molten salt process with a salt:($SrAl_2O_4$:Eu,Dy) ratio of 3:1 synthesized from α-alumina of 6 μm for 2 hours in a $N_2$—$H_2$ atmosphere using a temperature of 1000° C.

Example 3. $SrAl_2O_4$:Eu,Dy Synthesis and Characterization by Means of Synthesis in the Presence of Salts and $\alpha$-$Al_2O_3$a Having a Particle Size of 6 μm A pigment was synthesized at 1000° C. for 2 hours in $N_2$—$H_2$ for a salt:($SrAl_2O_4$:X) ratio corresponding to 3:1 using $\alpha$-$Al_2O_3$a having a particle size of 6 μm as alumina precursor (referred to as: SAO-6 μm $Al_2O_3$). FIG. 9 shows the diffractogram of the synthesized material.

Figure 10:
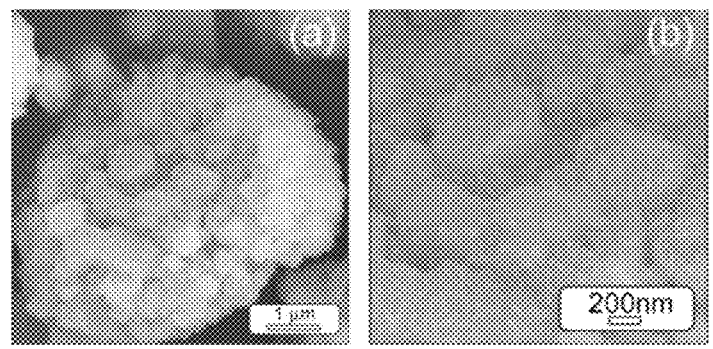
FIGS. 10(a-b) show the FE-SEM micrographs of $SrAl_2O_4$:Eu,Dy synthesized by means of a molten salt process with a salt:($SrAl_2O_4$:Eu,Dy) ratio of 3:1 synthesized from alumina of 6 μm for 2 hours in a $N_2$—$H_2$ atmosphere using a temperature of 1000° C.

FIGS. 10(a-b) show the micrographs obtained by scanning electron microscopy (FE-SEM) of the synthesized particles. It is seen that they have a particle size of 10 μm comprising particles with diameters less than 500 nm and salt nanocrystallizations. The crystallite size was 50±3 nm.

Figure 11:
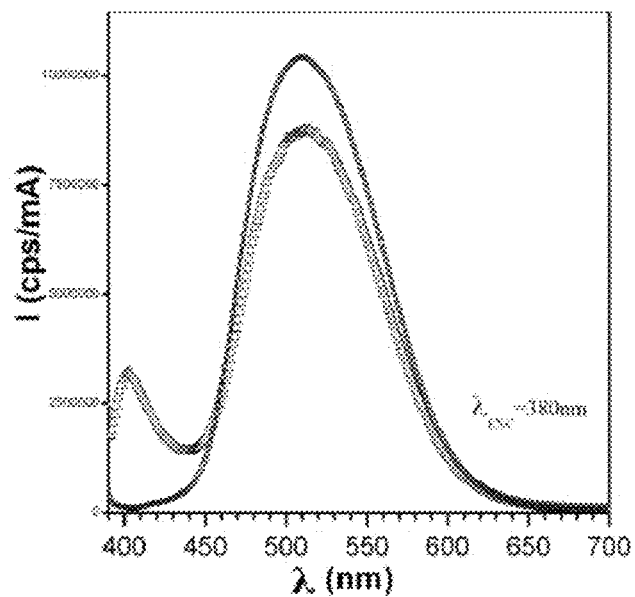
FIG. 11 shows the emission spectrum ($\lambda_{EXC}$=380 nm) of the reference material (line with circles) and of the material $SrAl_2O_4$:Eu,Dy treated at 1000° C. for 2 hours in reducing atmosphere for a salt:($SrAl_2O_4$:Eu,Dy) ratio of 3:1 synthesized from $Al_2O_3$ of 6 μm (line with triangles).

FIG. 11 shows the emission spectra of the material $SrAl_2O_4$:Eu,Dy treated at 1000° C. for 2 hours in reducing atmosphere for a salt:($SrAl_2O_4$:Eu,Dy) ratio of 3:1 synthesized from $Al_2O_3$ of 6 μm in comparison with the reference material. 83% of the intensity of the commercial reference material is obtained.

Figure 13:
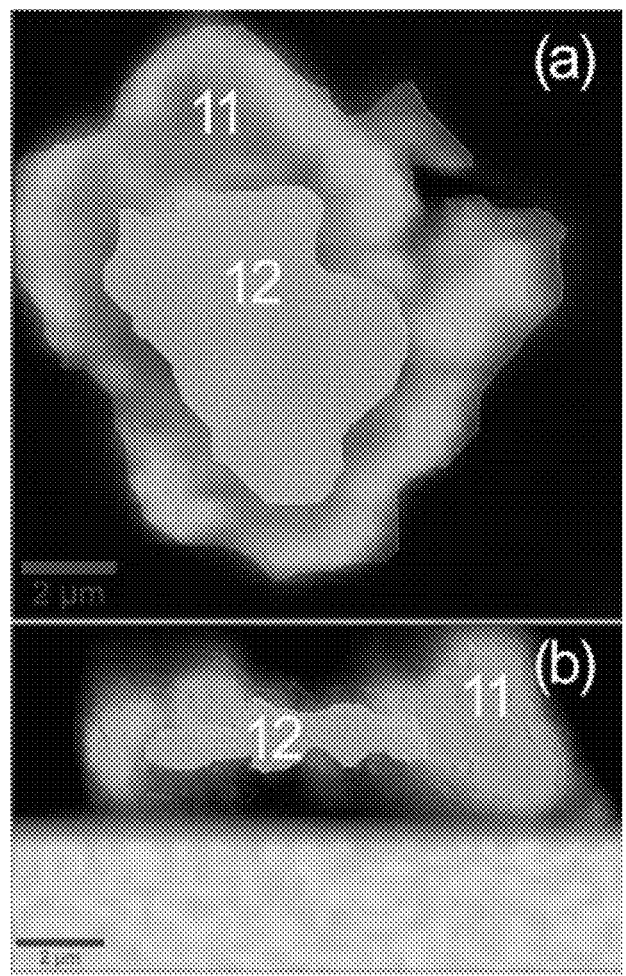

The Raman analysis (FIG. 12) gives rise to two types of Raman spectra corresponding with two regions (11) and (12) in FIG. 13 both characterized by having, as the main Raman mode, the Raman mode associated with vibration of the Al—O—Al bond corresponding to the $SrAl_2O_4$ phase, in which it is located at 470 cm$^{-1}$. Furthermore, a less intense mode of vibration associated with $SrAl_2O_4$ close to 795 cm$^{-1}$ can be seen. The region (12) furthermore has other Raman modes located at 418 cm$^{-1}$ and 757 cm$^{-1}$, associated with $Al_2O_3$, indicating that there is unreacted alumina in the core.

FIG. 14 shows the emission spectra of the particles treated at 1000° C. for 2 hours in $N_2$—$H_2$ atmosphere for a salt:($SrAl_2O_4$:Eu,Dy) ratio of 3:1 and using different $Al_2O_3$:$SrCO_3$ ratios of 1.25, 1.43, 1.66 and 2. The luminescence intensity of the band centered on 510 nm increases slightly. The dopant concentration is reduced to half when an $Al_2O_3$:$SrCO_3$ ratio of 2 is used.

FIG. 15 shows the luminescence decay, the initial intensity once excitation has been interrupted is 60% of the intensity of the reference product for the material $SrAl_2O_4$:Eu,Dy synthesized by means of a molten salt process with a salt:($SrAl_2O_4$:Eu,Dy) ratio of 3:1 synthesized from alumina of 6 μm for 2 hours in a $N_2$—$H_2$ atmosphere using a temperature of 1000° C., setting the emission at 510 nm and using the $Al_2O_3$/$SrCO_3$ ratio of 2.

Example 4. $SrAl_2O_4$:Eu,Dy Synthesis and Characterization by Means of Synthesis in the Presence of Salts and Reactive $\gamma$-$Al_2O_3$ A $SrAl_2O_4$:Eu,Dy pigment was synthesized by means of a molten salt process with a salt:($SrAl_2O_4$:Eu,Dy) ratio of 3:1 for 2 hours in a $N_2$—$H_2$ atmosphere using a temperature of 1000° C. and using $\gamma$-$Al_2O_3$ as alumina precursor and an excess of this alumina ($Al_2O_3$:$SrCO_3$ ratio of 2) is incorporated (Material referred to as: SAO-$\gamma$-$Al_2O_3$ Al/Sr=2). Furthermore, 1.25, 2.5, 3.75 and 5% by weight of ZnO are incorporated (Material referred to as: SAO-$\gamma$-$Al_2O_3$ Al/Sr=2+% ZnO).

FIG. 16 shows the diffractograms of the synthesized material. By using $\gamma$-$Al_2O_3$ as precursor alumina and incorporating an excess of this alumina ($Al_2O_3$:$SrCO_3$ of 2), the hexagonal phase of $SrAl_2O_4$ is stabilized. The values obtained for the crystallite size are 38, 34, 31, 29 and 30 nm for samples incorporating 0, 1.25, 2.5, 3.75 and 5% by weight, respectively.

It is observed that the emission spectrum (FIG. 17) has a band centered on 510 nm. It is also observed that the incorporation of ZnO up to 5% increases photoluminescence intensity. The photoluminescence intensity decreases with higher ZnO concentrations, FIG. 16 shows the emission spectrum of the particles with 10% by weight of ZnO incorporated as an example. The TEM and HR-TEM analyses of the material $SrAl_2O_4$:Eu,Dy synthesized from $\gamma$-$Al_2O_3$ incorporating excess $Al_2O_3$ ($Al_2O_3$:$SrCO_3$ ratio of 2) treated at 1000° C. for 2 hours in $N_2$—$H_2$ for a salt:($SrAl_2O_4$:Eu,Dy) ratio of 3:1 are illustrated in FIG. 18. Crystalline coherence domain 20 nm favors quantum improvement in photoluminescence. The improvement in photoluminescence can be attributed to different factors which can be complementary: (1) the ZnO as mineralizing agent tends to place the dopants in the crystal lattice. (2) The ZnO significantly reduces the crystallite size.

Example 5. Properties of the Reference Material in Comparison with the Results of the Materials Synthesized in Examples 2-4

Table 1 lists the different properties of the synthesized materials in comparison with the reference material.

TABLE 1

Properties of the reference material in comparison with the results of the materials synthesized in Examples 2-4 and the materials synthesized by means of molten salts referred to as (13) SAO MS 6 μm $Al_2O_3$ (Al/Sr = 1) of Example 3, (14) SAO MS 6 μm $Al_2O_3$ (Al/Sr = 2) of Example 3 and (15) $SrAl_2O_4$:Eu,Dy pigment of Example 4 (Al/Sr = 2) + 5% ZnO.

| Sample | Crystal lite size (nm) | Photolumi- nescence intensity (cps/mA) | % of photolumi- nescence intensity | Particle size $d_{50}$ (μm) |
|---|---|---|---|---|
| Reference | 108 | 10.42E+06 | 100 | 20 |
| SAO MS 6 μm $Al_2O_3$ (Al/Sr = 1) of Example 3 | 50 | 8.74E+06 | 83 | 10 |
| SAO MS 6 μm $Al_2O_3$ (Al/Sr = 2) of Example 3 | 51 | 9.38E+06 | 90 | 10 |
| $SrAl_2O_4$:Eu,Dy pigment of Example 4(Al/Sr = 2) + 5% ZnO | 30 | 6.98E+06 | 67 | 0.1 |

FIG. 19 shows the photoluminescence intensity in comparison with the photoluminescence values as a function of crystallite size. The $SrAl_2O_4$:Eu,Dy pigments of the present invention showed photoluminescence intensity values clearly greater than those corresponding to pigments with similar crystallite size. The improvement in photoluminescent response is related to the presence of nanocrystals having a tridymite structure growing on the substrate of alumina particles and to the presence of salt nanocrystallizations. The nanostructure of the pigments of the present invention favors quantum efficiency processes.

The color and brightness of the samples were obtained in the CIEL*a*b* system, which is the most widely used uniform color space for determining surface color. This system is made up of coordinates L*, measuring the lightness of the color from white (L*=100) to black (L*=0), coordinate a*, ranging from green (−a*) to red (+a*), and coordinate b*, going from blue (−b*) to yellow (+b*). Table 2 shows the result with the different CIEL*a*b* space color coordinates for the standard referred to as white. The difference in color between two samples can be analyzed by means of tolerance (ΔE*).

TABLE 2

Values of the color coordinates (L*, a* and b*) and the difference in color between the measured material and white standard (ΔE*).

| Sample | a* | b* | L* | Tolerance value ΔE* |
|---|---|---|---|---|
| White standard | −0.06 | −0.1 | 99.41 | — |
| Reference | −5.28 | 9.36 | 93.58 | 12.28 |
| SAO MS 6 μm $Al_2O_3$ (Al/Sr = 1) of Example 3 | −0.56 | 5.66 | 94.12 | 7.84 |
| SAO MS 6 μm $Al_2O_3$ (Al/Sr = 2) of Example 3 | −6.12 | 10.56 | 95.54 | 6.94 |
| $SrAl_2O_4$:Eu,Dy pigment of Example 4 (Al/Sr = 2) + 5% ZnO | −1.71 | 2.77 | 93.92 | 6.42 |

The pigments of the invention showed an improvement in terms of color coordinates since they are closer to white. This aspect along with the particle size is of particular interest for use thereof in printing security articles.

Example 6. Example of Raman Response of the $SrAl_2O_4$:Eu,Dy Pigment in Security Articles FIG. 20 shows the Raman Spectrum of the reference material in the range of 60-3800 cm$^{-1}$. The Raman mode located at 470 cm$^{-1}$ is attributed to the internal vibration of the [$AlO_4$] units of $SrAl_2O_4$. The Raman bands in the range of 1300-3800 cm$^{-1}$ correspond to luminescence bands due to the $Eu^{3+}$ activator center when causing the excitation of the material with laser (λ=532 nm).

FIG. 21 shows the Raman Spectrum of the material $SrAl_2O_4$:Eu,Dy synthesized by means of a molten salt process with a salt:($SrAl_2O_4$:Eu,Dy) ratio of 3:1 synthesized from alumina of 6 μm for 2 hours in a $N_2$—$H_2$ atmosphere using a temperature of 1000° C. and using an $Al_2O_3$:$SrCO_3$ ratio of 1.

FIG. 22 shows the Raman Spectrum of the material $SrAl_2O_4$:Eu,Dy synthesized by means of a molten salt process with a salt:($SrAl_2O_4$:Eu,Dy) ratio of 3:1 synthesized from alumina of 0.1 μm for 2 hours in an atmosphere consisting of air, using a temperature of 1400° C. and using an $Al_2O_3$:$SrCO_3$ ratio of 1.

Example 7. Use of the $SrAl_2O_4$:Eu,Dy Pigment in Printing Security Tags

The installations and materials used to carry out this example were a silk screen printing machine manufactured by Stork, a silk screen manufactured by Stork, natural cellulose-based fibrous paper manufactured in a round paper machine, iridescent ink, anti-foaming agent and $SrAl_2O_4$:Eu,Dy pigment synthesized by means of a molten salt process with a salt:($SrAl_2O_4$:Eu,Dy) ratio of 3:1 synthesized from alumina of 6 μm for 2 hours in a $N_2$—$H_2$ atmosphere, using a temperature of 1000° C. and using an $Al_2O_3$:$SrCO_3$ ratio of 1, and incorporated to an aqueous medium for obtaining a suspension of particles dispersed on kaolin microparticles with a solid content of 40% by weight.

The main characteristics of the indicated installations and materials are provided in detail below:
Conditions of the printing machine on each side of the paper:
Drying tunnel temperature: 145° C.
Machine speed: 70 m/min
Suction speed: 2500 rpm
Blowing speed: 2400 rpm
Residual moisture of the paper after drying: 6.5%
Conditions of the silk screen:
Reference: RSI900
Development: 25⅜"
Mesh: 105

Open area: 15%
Thickness: 105 micron
Width: 910 mm
Conditions of the iridescent ink and additives:
Commercial name of the ink: Silk screen printing ink 5WR1241
Commercial name of the anti-foaming agent: Additive 880775
Commercial name of the cross-linking agent: Additive 370010
Ink viscosity after adding the cross-linking agent: 20 s CP4
Printing ink viscosity: 18 s CP4
Main conditions of the paper:
Fibrous composition: 100% cotton cellulose
Grammage: 90 g/m$^2$
Grammage after the varnishing process: 96 g/m$^2$
Thickness: 115 microns
Bendtsen smoothness on the felt side: <700 ml/min
Bendtsen smoothness on the fabric side: <800 ml/min
Bendtsen porosity: <20 ml/min
Bendtsen porosity after creasing: <140 ml/min
Cobb value: 40-70 g/cm$^2$
Ash: <3%
Opacity: 84%
Implementation Method Once the printing machine has been started up for attaining the established machine conditions, the silk screen was placed, the reel of paper was placed on the unwinding shaft and the paper web was distributed in the machine circuit, the ink was mixed with the cross-linking agent at a proportion of 1.5% by weight of the latter over the former, under gentle stirring conditions in the 20 kg ink drum itself. 100 ml of the pigment and anti-foaming agent were added to this mixture. Once the perfect dispersion of the components was assured, the content of the drum was pumped to the inkwell of the printing machine and the paper was positioned on the printing silk screen starting the printing of the ink through the holes of the screen according to the graphical design established therein on one of the sides, controlling the final moisture of the paper, ink viscosity and the machine conditions throughout the printing process.

Example 8. Use of the SrAl$_2$O$_4$:Eu,Dy Pigment in Coated Paper of Self-Adhesive Security Tags A knife coating machine which is supplied with a coating slip previously prepared according to the following formula specially indicated for use of the coated paper in offset printing techniques for self-adhesive security tags was used to carry out this example:
Mineral fillers: 80% calcium carbonate (Ref Albacar HO Slurry manufactured by Specialty Minerals) and 20% kaolin (Reference Supragloss 95 manufactured by lmerys) to obtain 50 parts of the slip.
Synthetic binder: 10 parts butadiene styrene latex (Reference Styronal D-517 manufactured by BASF)
Synthetic co-binder: 2 parts (reference Acronal 700 L manufactured by BASF)
Thickener: 1 part carboxymethyl cellulose
Insolubilizing agent: 1 part (Reference Basocoll OV manufactured by BASF)
Additives: 1 part sodium hydroxide
Aqueous dispersion of the SrAl$_2$O$_4$:Eu,Dy pigment: 1 part
Water: The rest up to 100 parts.

The self-adhesive paper which is used for being coated has the following characteristics:
Total grammage: 200 g/m$^2$
Siliconized support grammage: 82 g/m$^2$
Adhesive grammage: 20 g/m$^2$
Fibrous composition of the front: 100% cellulose from mechanical pulp
Conditions of the coating machine:
Drying tunnel temperature: 145° C.
Machine speed: 150 m/min
Residual moisture of the paper after drying: 6.5%
Characteristics of the coated paper:
Total grammage: 220 g/m$^2$
Coated layer grammage: 20 g/m$^2$
Bekk smoothness on the coated side: 200 sec
Ash: 20%
Opacity: 84%
Implementation method:

Once the coating machine has been started up for attaining the established machine conditions, the reel of paper was placed on the unwinding shaft and the paper web was distributed in the machine circuit, the coating slip was metered into the tray of the knife coater and the coating process was started according to the established machine conditions until using up the reel. After the coating process, the reel of paper was calendered until achieving the established smoothness and cut to the format necessary for the subsequent process for sheet or reel printing of the security tags.

Example 9. Thin SrAl$_2$O$_4$:Eu,Dy Film Synthesis and Characterization by Means of Synthesis in the Presence of Salts on Polycrystalline Alumina Plates Thin SrAl$_2$O$_4$:Eu,Dy films were synthesized using sintered polycrystalline alumina plates as Al$_2$O$_3$ substrate.

To that end, a mixture of SrCO$_3$, Eu$_2$O$_3$, Dy$_2$O$_3$ and (NaCl—KCl)$_e$ was prepared and homogenized in a planetary mill for 8 hours with 40% by weight of an organic vehicle consisting of α-terpineol, ethyl cellulose and [2-(2-butoxy.etoxy-ethyl)]. A pulp which was deposited on the alumina substrate by silk screen printing at 1000° C. for 2 hours in a N$_2$—H$_2$ atmosphere was obtained.

FIG. 23 shows the X-ray diffractogram of the Al$_2$O$_3$ substrate (diffractogram located at the bottom) and the aluminate film grown on the thermally treated Al$_2$O$_3$ plate (diffractogram located at the top). The diffractogram of the Al$_2$O$_3$ substrate has diffraction peaks characteristic of alumina. The diffractogram of the aluminate film grown on the alumina plate shows peaks characteristic of the monoclinic phase P2$_1$ of strontium aluminate located in the range of 28–30° 2θ (JCPDS File No. 34-0379) and also peaks corresponding to the alumina substrate.

FIG. 24 shows the micrographs obtained by means of scanning electron microscopy (FE-SEM) of (a) Al$_2$O$_3$ substrate and (b and c) the synthesized aluminate film. The formation of strontium aluminate nanocrystals and salt residues was observed on the grains of sintered alumina. Chemical analyses were performed on the synthesized aluminate film by means of energy dispersive spectroscopy (EDX). The elements detected in the chemical analyses are Sr, Al, O, Eu and Dy. The formulated percentage of Sr$_{0.97}$Al$_2$O$_4$:Eu$_{0.02}$Dy$_{0.01}$ is 13.9, 28.6, 57.1, 0.3 and 0.1 for Sr, Al, O, Eu and Dy, respectively. The atomic % of the elements present is 10.3, 31.5, 57.9, 0.20 and <0.10 for Sr, Al, O, Eu and Dy for the SrAl$_2$O$_4$:Eu,Dy film obtained.

FIG. 25 shows the emission spectra of the reference material and the SrAl$_2$O$_4$:Eu,Dy film obtained. The photoluminescence intensity for the doped strontium aluminate film is >80% with respect to the intensity of the reference material.

Example 10. CaAl$_2$O$_4$:Eu,Nd Synthesis and Characterization by Means of Synthesis in the Presence of Salts and α-Al$_2$O$_3$ Having a Particle Size of 6 μm A pigment was synthesized at 1000, 1200 and 1400° C. for 2 hours in N$_2$—H$_2$ for a salt:(CaAl$_2$O$_4$:X) ratio corresponding to 3:1 using as alumina precursor α-Al$_2$O$_3$ having a particle size of 6 μm. FIG. 26 shows the diffractogram of the synthesized material depicted previously.

FIG. 27 shows the emission spectra of the material CaAl$_2$O$_4$:Eu,Nd treated at 1000 (dashed line), 1200 (solid line) and 1400° C. (line with triangles) for 2 hours in reducing atmosphere for a salt:(CaAl$_2$O$_4$:Eu,Dy) ratio of 3:1 synthesized from α-Al$_2$O$_3$ of 6 μm in comparison with the reference material based on SrAl$_2$O$_4$:Eu,Dy (line with circles). The emission spectra displaces at low wavelengths, <450 nm, as a consequence of the use of Ca-cations in the aluminate structure. An additional advantage come from the data that emission intensity increases 45% respect to the one of the reference material for the pigment treated at 1400° C. because of the high formation of the aluminate structure occurs.

Example 11. SrAl$_2$O$_4$:Eu,Dy Synthesis and Characterization by Means of Synthesis in the Presence of Salts and α-Al$_2$O$_3$ Having a Particle Size of 6 μm A pigment was synthesized at 1200 and 1400° C. for 2 hours in N$_2$—H$_2$ for a salt:(SrAl$_2$O$_4$:X) ratio corresponding to 3:1 using α-Al$_2$O$_3$ having a particle size of 6 μm as alumina precursor. FIG. 28 shows the diffractogram of the synthesized material.

FIG. 29 shows the emission spectra of the material SrAl$_2$O$_4$:Eu,Dy treated at 1200 (line with starts) and 1400° C. (line with diamonds) for 2 hours in reducing atmosphere for a salt:(SrAl$_2$O$_4$:Eu,Dy) ratio of 3:1 synthesized from ~Al$_2$O$_3$a of 6 μm in comparison with the reference material (line with circles). The synthesized pigment maintained the particle size because of the limitation imposed by the precursor size of α-Al$_2$O$_3$a of 6 μm particles and the crystallite size obtained was 50 and 55 nm for the thermal treatment at 1200° C. and 1400° C., respectively. By comparison with the reference pigment an increase up to 45% in intensity was attained for the thermally synthesized pigment at 1400° C.

FIG. 31 shows the Raman Spectra of the material SrAl$_2$O$_4$:Eu,Dy synthesized by means of a molten salt process with a salt:(SrAl$_2$O$_4$:Eu,Dy) ratio of 3:1 synthesized from α-alumina of 6 μm for 2 hours in an a N$_2$—H$_2$ atmosphere, using a temperature of 1400° C. and using an Al$_2$O$_3$:SrCO$_3$ ratio of 2, as obtained for two different excitation lines at 532 (dashed line) and 785 (solid line) nm. The inset show in detail the spectrum obtained at 532 (dashed line). The nanostructured phosphorescent pigment of the present invention has Raman peaks between 900 and 3500 cm$^{-1}$, preferably Raman peaks in 1000 and 2000 cm$^{-1}$ obtained at 785 nm. The advantage of the Raman spectra for this pigment was the high intensity recorder.

The invention claimed is:

1. A nanostructured phosphorescent pigment comprising:
an Al$_2$O$_3$ substrate;
MAl$_2$O$_4$:X nanocrystals, where M is a cation selected from Ca$^{2+}$, Sr$^{2+}$, Ba$^{2+}$, Mg$^{2+}$, Zn$^{2+}$ and combinations thereof, and where X is a cation selected from Eu$^{2+}$, Dy$^{3+}$, Nd$^{3+}$, Er$^{3+}$, La$^{3+}$, Lu$^{3+}$, Ce$^{3+}$, Y$^{3+}$, Sm$^{3+}$, Gd$^{3+}$, Tb$^{3+}$, Tm$^{3+}$, Yb$^{3+}$ and combinations thereof, disposed on the Al$_2$O$_3$ substrate; and
nanocrystals of at least one salt used in a molten salt process disposed on the MAl$_2$O$_4$:X nanocrystals.

2. The nanostructured phosphorescent pigment according to claim 1, wherein the particle size of the pigment is ≤10 μm.

3. The nanostructured phosphorescent pigment according to claim 1, wherein the Al$_2$O$_3$ substrate is α-Al$_2$O$_3$.

4. The nanostructured phosphorescent pigment according to claim 1, wherein the size of the MAl$_2$O$_4$:X nanocrystals is ≤500 nm.

5. The nanostructured phosphorescent pigment according to claim 1, wherein the salt is a eutectic mixture.

6. The nanostructured phosphorescent pigment according to claim 1, wherein the salt:(MAl$_2$O$_4$:X) molar ratio is comprised between 1:1 and 5:1.

7. The nanostructured phosphorescent pigment according to claim 1, further comprising an outer layer comprising hybrid silica nanoparticles.

8. The nanostructured phosphorescent pigment according to claim 1, wherein the at least one salt used in the molten salt process comprises a species selected from the group consisting of Na$_2$SO$_4$, K$_2$SO$_4$, Li$_2$SO$_4$, NaCl, KCl, LiCl and mixtures thereof.

9. A method for preparing the nanostructured phosphorescent pigment as defined in claim 1, comprising the steps of:
i) mixing starting materials comprising a cation M precursor, a cation X precursor, Al$_2$O$_3$ and at least one salt used in a molten salt process; and
ii) heating the mixture resulting from step (i) at a temperature between 900° and 1400° C. in reducing atmosphere.

10. The method for preparing the nanostructured phosphorescent pigment according to claim 9, wherein the particle size of Al$_2$O$_3$ of step i) is less than or equal to 6 μm.

11. The method for preparing the nanostructured phosphorescent pigment according to claim 9, wherein step i) comprises an Al$_2$O$_3$:cation M precursor molar ratio of ≤2.

12. The method for preparing the nanostructured phosphorescent pigment according to claim 9, comprising a step iii) of adding an ethanol/water solution of a silica precursor and an acid on the material resulting from step ii) to obtain an outer layer comprising hybrid silica nanoparticles.

13. The method for preparing the nanostructured phosphorescent pigment according to claim 9, wherein the at least one salt used in the molten salt process comprises a species selected from the group consisting of Na$_2$SO$_4$, K$_2$SO$_4$, Li$_2$SO$_4$, NaCl, KCl, LiCl and mixtures thereof.

14. A method of making an object to be authenticated, signaled, illuminated or decorated, the method comprising: incorporating a nanostructured phosphorescent pigment in the object; or
coating the object with the nanostructured phosphorescent pigment, wherein the nanostructured phosphorescent pigment comprises:
an $Al_2O_3$ substrate;
$MAl_2O_4$:X nanocrystals, where M is a cation selected from $Ca^{2+}$, $Sr^{2+}$, $Ba^{2+}$, $Mg^{2+}$, $Zn^{2+}$ and combinations thereof, and where X is a cation selected from $Eu^{2+}$, $Dy^{3+}$, $Nd^{3+}$, $Er^{3+}$, $La^{3+}$, $Lu^{3+}$, $Ce^{3+}$, $Y^{3+}$, $Sm^{3+}$, $Gd^{3+}$, $Tb^{3+}$, $Tm^{3+}$, $Yb^{3+}$ and combinations thereof, disposed on the $Al_2O_3$ substrate; and
nanocrystals of at least one salt used in a molten salt process disposed on the $MAl_2O_4$:X nanocrystals.

15. A security article comprising the nanostructured phosphorescent pigment according to claim 1.

16. The security article according to claim 15 which is selected from security paper, an envelope, a check, a promissory note, a banknote, an identity card, a passport, a ticket, a seal, a pass, a certificate, a tag or a label.

* * * * *